US012610094B2

(12) United States Patent
Fear et al.

(10) Patent No.: US 12,610,094 B2
(45) Date of Patent: Apr. 21, 2026

(54) PREDICTING APPLICATION STATES FOR SUPPLEMENTAL CONTENT INSERTION

(71) Applicant: Nvidia Corporation, Santa Clara, CA (US)

(72) Inventors: Andrew Fear, Cedar Park, TX (US); YuCheng Liu, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 134 days.

(21) Appl. No.: 18/363,917

(22) Filed: Aug. 2, 2023

(65) Prior Publication Data

US 2025/0047910 A1     Feb. 6, 2025

(51) Int. Cl.
H04N 21/234       (2011.01)
H04N 21/431       (2011.01)
H04N 21/442       (2011.01)

(52) U.S. Cl.
CPC ... H04N 21/23424 (2013.01); H04N 21/4316 (2013.01); H04N 21/4424 (2013.01)

(58) Field of Classification Search
CPC ......... H04N 21/23424; H04N 21/4316; H04N 21/4424
USPC ........................................................ 725/32
See application file for complete search history.

(56) References Cited

U.S. PATENT DOCUMENTS 7,698,178 B2 * 4/2010 Chu .................... G06Q 30/0209
                                                    705/28
11,249,740 B1 * 2/2022 Kennedy ................. A63F 13/71

11,689,625 B1 * 6/2023 Phillips ................. G06F 9/4451
                                                    709/224
11,800,202 B2 * 10/2023 Marten .................. G06F 40/279
11,805,287 B2 * 10/2023 Subramanian ..... H04N 21/8586
12,121,803 B2 * 10/2024 Cerny ..................... A63F 13/44
12,179,095 B2 * 12/2024 Phillips .............. H04N 21/4781
12,206,941 B2 * 1/2025 Robert Jose ......... H04N 21/458
2010/0273558 A1 * 10/2010 Gustafsson ........... H04L 43/087
                                                    463/42
2014/0274415 A1 * 9/2014 Benzon .............. H04N 21/6187
                                                    463/42
2017/0094356 A1 * 3/2017 Mathews ............. H04N 21/812
2017/0354878 A1 * 12/2017 Posin ...................... A63F 13/35
2019/0308099 A1 * 10/2019 Lalonde ................ A63F 13/352
2021/0260936 A1 * 8/2021 Bout .................... B60C 23/0471
2022/0088474 A1 * 3/2022 Dicken .................... A63F 13/79
2022/0172102 A1 * 6/2022 Finkelshtein ........... G06N 5/01
2023/0148314 A1 * 5/2023 Singh .................. G06F 9/45558
                                                    718/1
2023/0330522 A1 * 10/2023 Phillips ............ H04N 21/23424

(Continued)

*Primary Examiner* — Sahar Aqil Riaz
(74) *Attorney, Agent, or Firm* — Hogan Lovells US LLP

(57) ABSTRACT

Approaches presented herein provide systems and methods for determining different states for distributed computing processes based on information acquired from underlying hardware. Different tasks may be executed by hardware for a given distributed computing process having a certain hardware configuration and for a given application. Telemetry information may be acquired to identify different states according to the telemetry information independent from underlying application engines. Thereafter, identification of different application states enables prediction of time periods between various application states, which may provide opportunities for additional processing tasks, such as providing supplemental content.

20 Claims, 18 Drawing Sheets

(56)     References Cited

U.S. PATENT DOCUMENTS

| | | | | |
|---|---|---|---|---|
| 2023/0336836 A1* | 10/2023 | Phillips | ................. | A63F 13/493 |
| 2024/0155033 A1* | 5/2024 | Wei | ......................... | A63F 13/92 |
| 2025/0041720 A1* | 2/2025 | Fortuna | ................. | G06F 3/1431 |

* cited by examiner

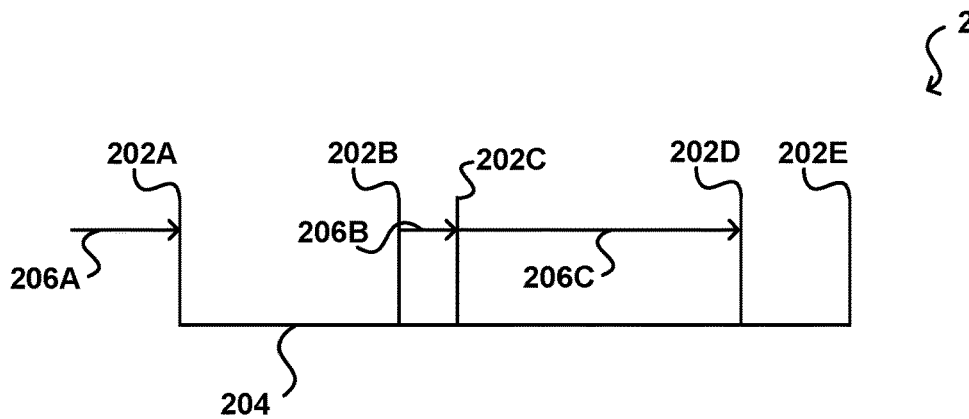
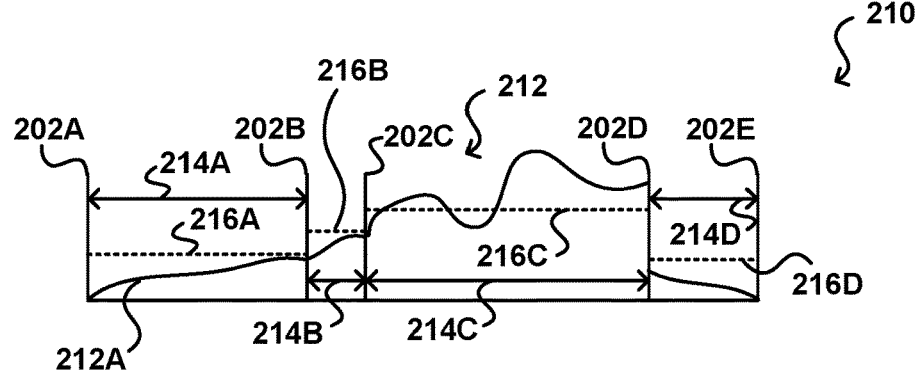
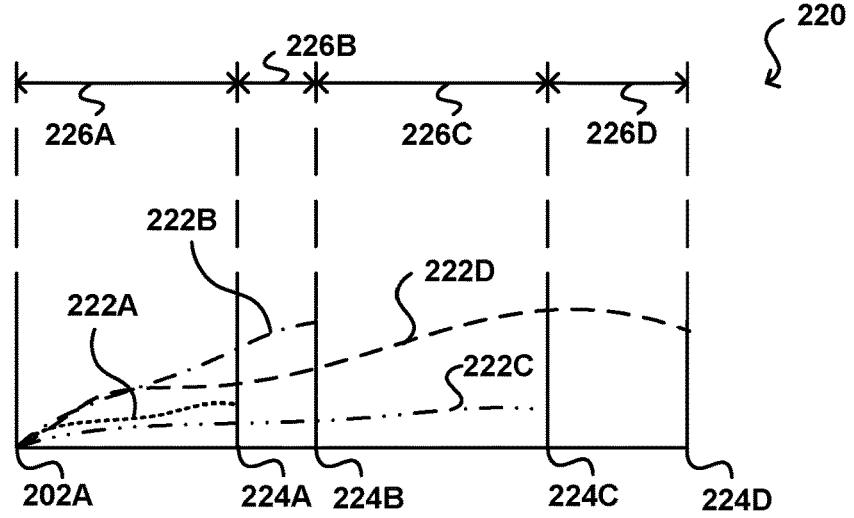
FIG. 2

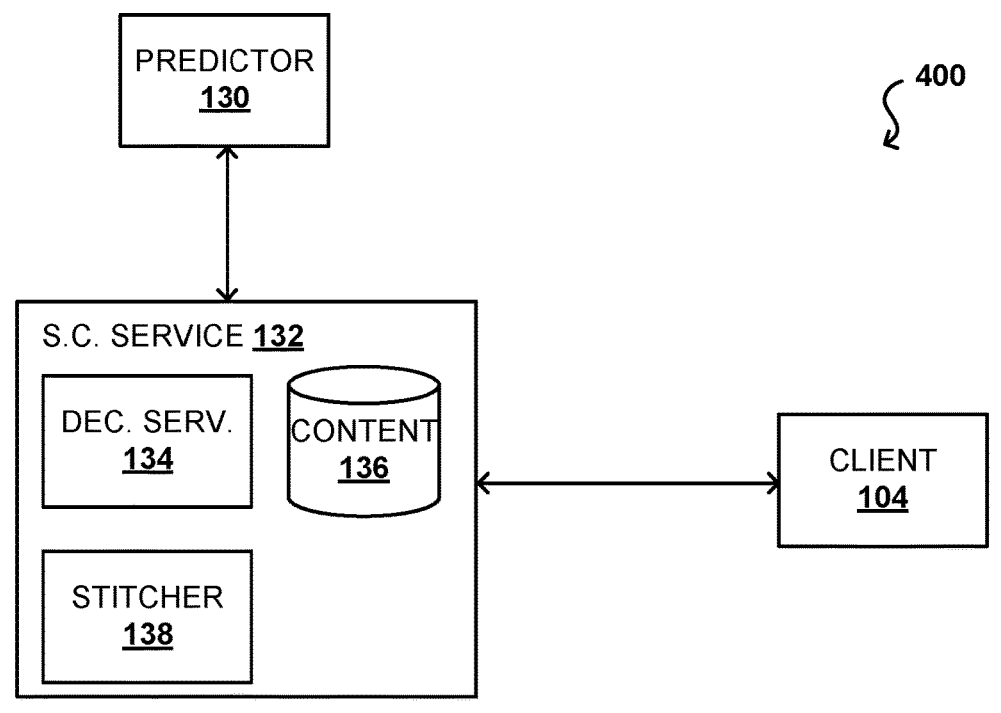
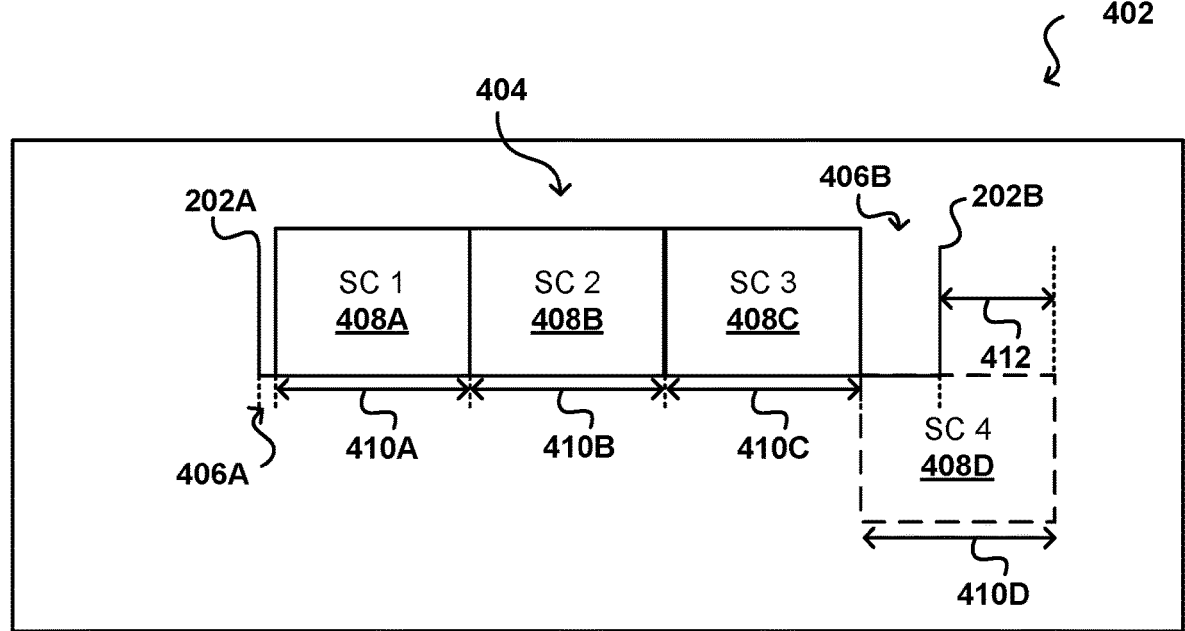
FIG. 4

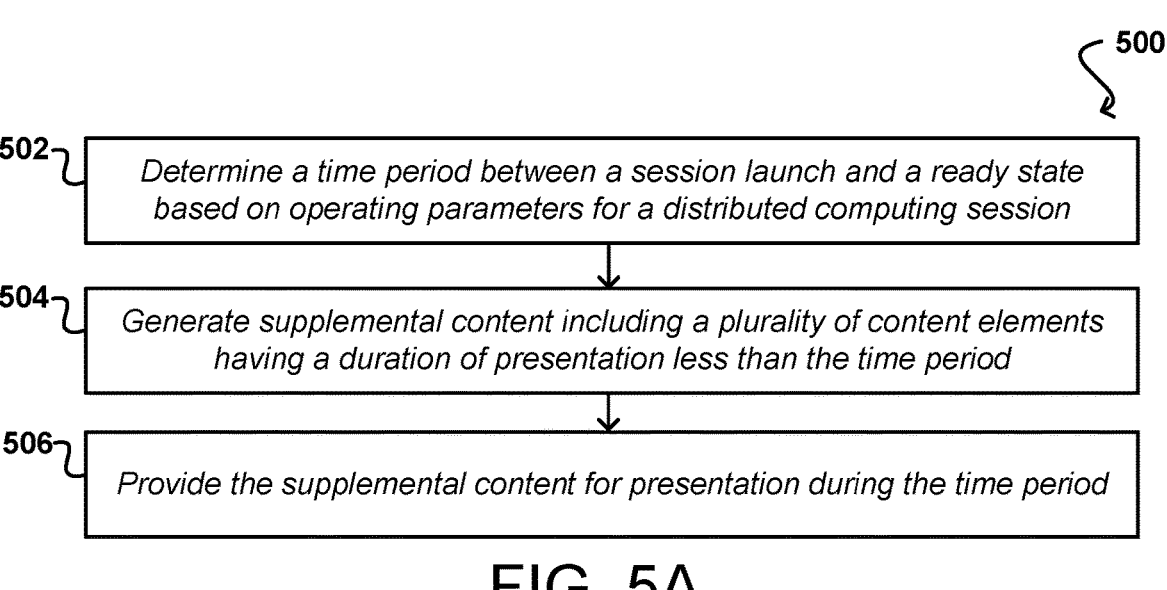

500

502 — Determine a time period between a session launch and a ready state based on operating parameters for a distributed computing session 504 — Generate supplemental content including a plurality of content elements having a duration of presentation less than the time period 506 — Provide the supplemental content for presentation during the time period

FIG. 5A

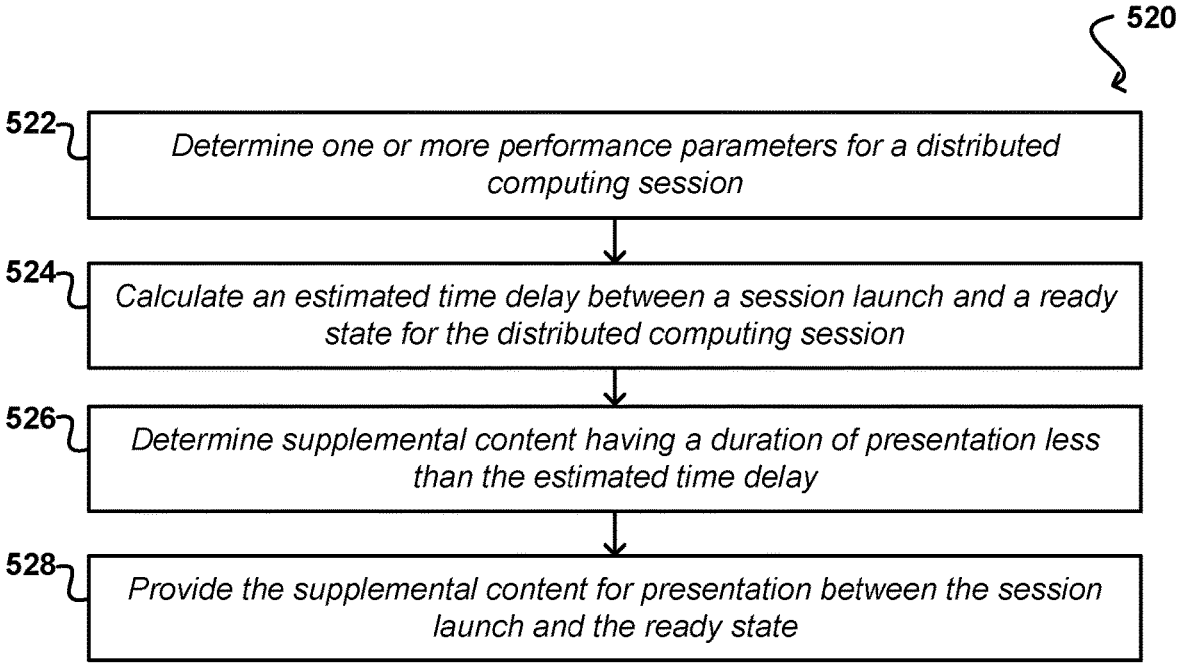

520

522 — Determine one or more performance parameters for a distributed computing session 524 — Calculate an estimated time delay between a session launch and a ready state for the distributed computing session 526 — Determine supplemental content having a duration of presentation less than the estimated time delay 528 — Provide the supplemental content for presentation between the session launch and the ready state

FIG. 5B

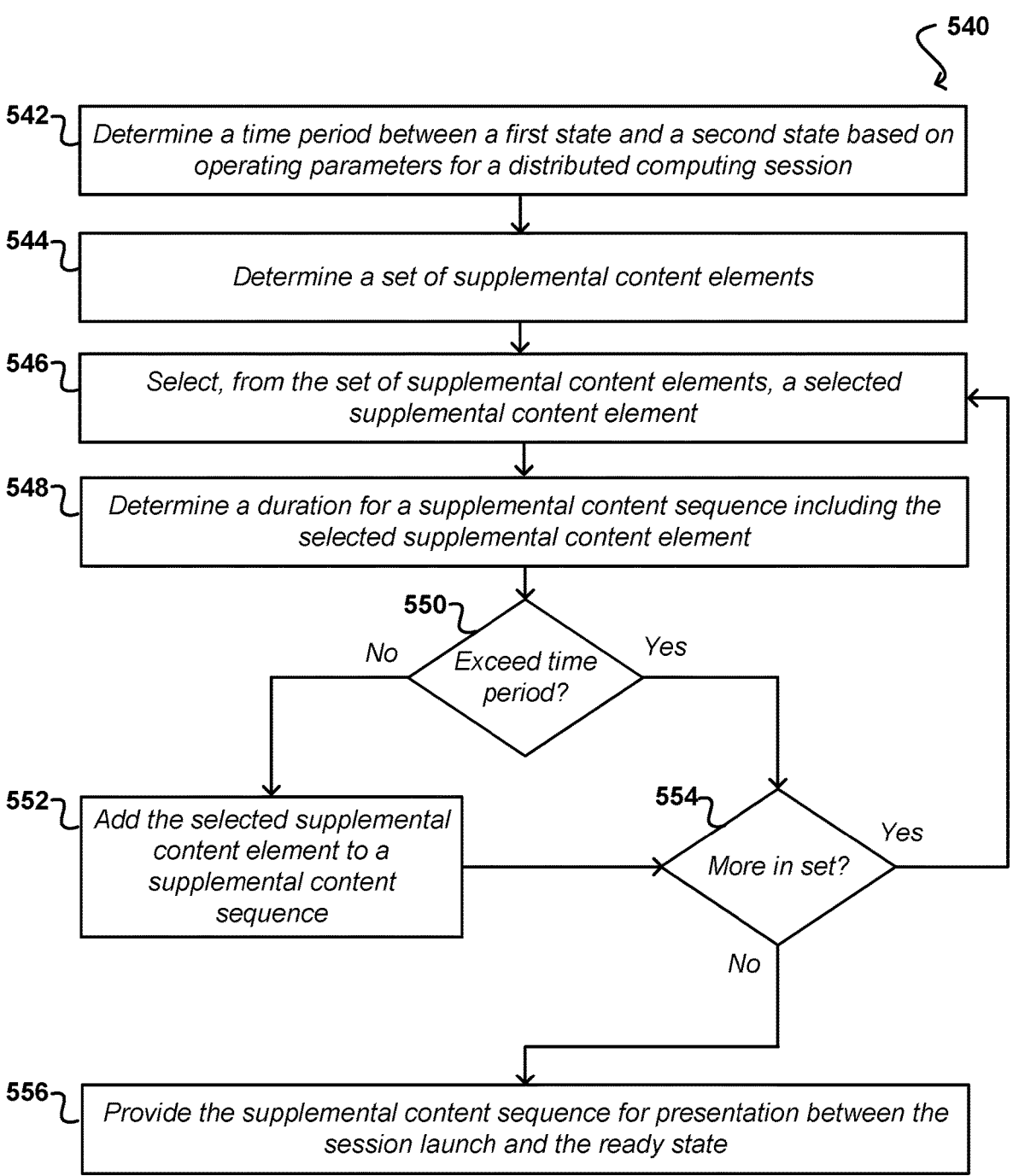

540

542 — Determine a time period between a first state and a second state based on operating parameters for a distributed computing session 544 — Determine a set of supplemental content elements 546 — Select, from the set of supplemental content elements, a selected supplemental content element 548 — Determine a duration for a supplemental content sequence including the selected supplemental content element 550 — Exceed time period?

552 — Add the selected supplemental content element to a supplemental content sequence 554 — More in set?

556 — Provide the supplemental content sequence for presentation between the session launch and the ready state

DATA CENTER
800

PROCESSOR 902

715

EXECUTION UNIT 908

CACHE 904

REGISTER FILE 906

PACKED INSTRUCTION SET 909

PROCESSOR BUS 910

GRAPHICS/ VIDEO CARD 912

914

MEMORY CONTROLLER HUB 916

918

MEMORY 920

INSTRUCTION(S) 919

DATA 921

922

DATA STORAGE 924

WIRELESS TRANSCEIVER 926

FLASH BIOS 928

I/O CONTROLLER HUB 930

LEGACY I/O CONTROLLER 923

USER INPUT INTERFACE 925

SERIAL EXPANSION PORT 927

AUDIO CONTROLLER 929

NETWORK CONTROLLER 934

900

1300

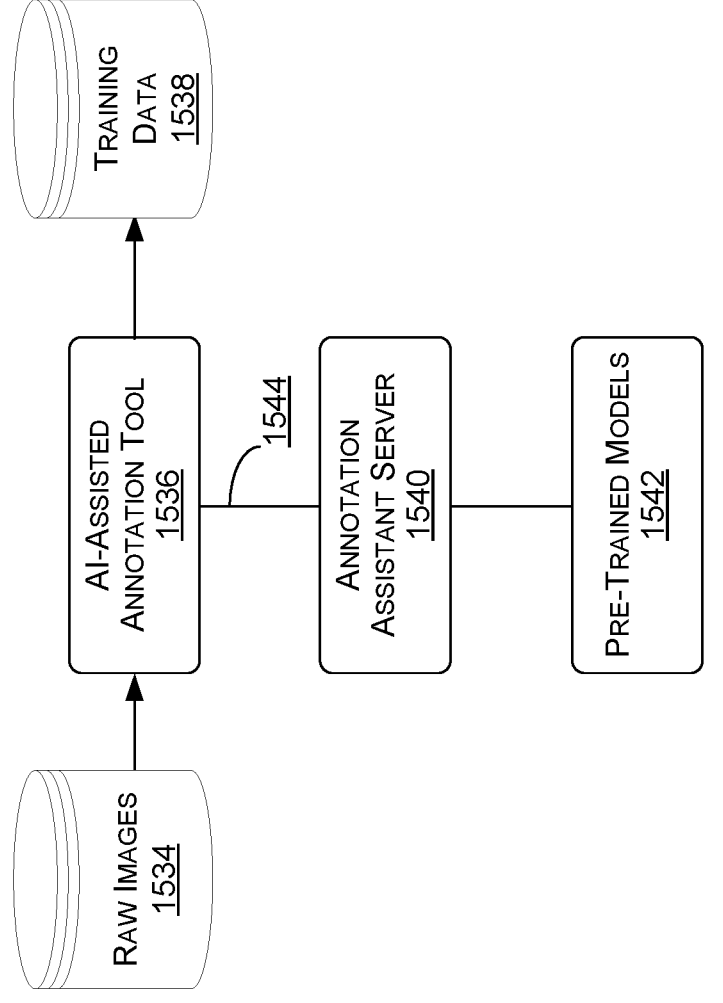
FIG. 15B

PREDICTING APPLICATION STATES FOR SUPPLEMENTAL CONTENT INSERTION

BACKGROUND

Many applications provide content or interactive elements to a user for limited or unlimited periods of time. Often, use of the resources and associated content may be provided as a service to the user, where the user may pay a fee to access the resources and/or content or may provide alternative forms of compensation, such as by viewing supplemental content or the like. With these systems, access to the content and/or capabilities of the resources to access content may be throttled or otherwise restricted in accordance with a level of access provided to the user. While throttling the services may ensure that the resource provider receives sufficient incentivization, it may also degrade the user experience, and as a result, the user may stop using the service all together. This may be especially true when the throttling affects content presentation, such as stopping a scene during an important point to insert supplemental content or by artificially delaying progression. Content providers may dislike how artificial throttling and delays affect their content, which may also frustrate the users with respect to both the content provider and the resource provider.

BRIEF DESCRIPTION OF THE DRAWINGS

Various embodiments in accordance with the present disclosure will be described with reference to the drawings, in which:

FIG. 2 illustrates an example diagram of different states compared to one or more computational loads, in accordance with various embodiments;

FIG. 4 illustrates an example environment for selecting content elements for inclusion with a sequence, in accordance with various embodiments;

FIG. 5A illustrates an example process for determining a delay time between different compute states, in accordance with various embodiments;

FIG. 5B illustrates an example process for determining content for presentation during a delay time, in accordance with various embodiments;

FIG. 5C illustrates an example process for selecting supplemental content for inclusion within a supplemental content sequence, in accordance with various embodiments;

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1:
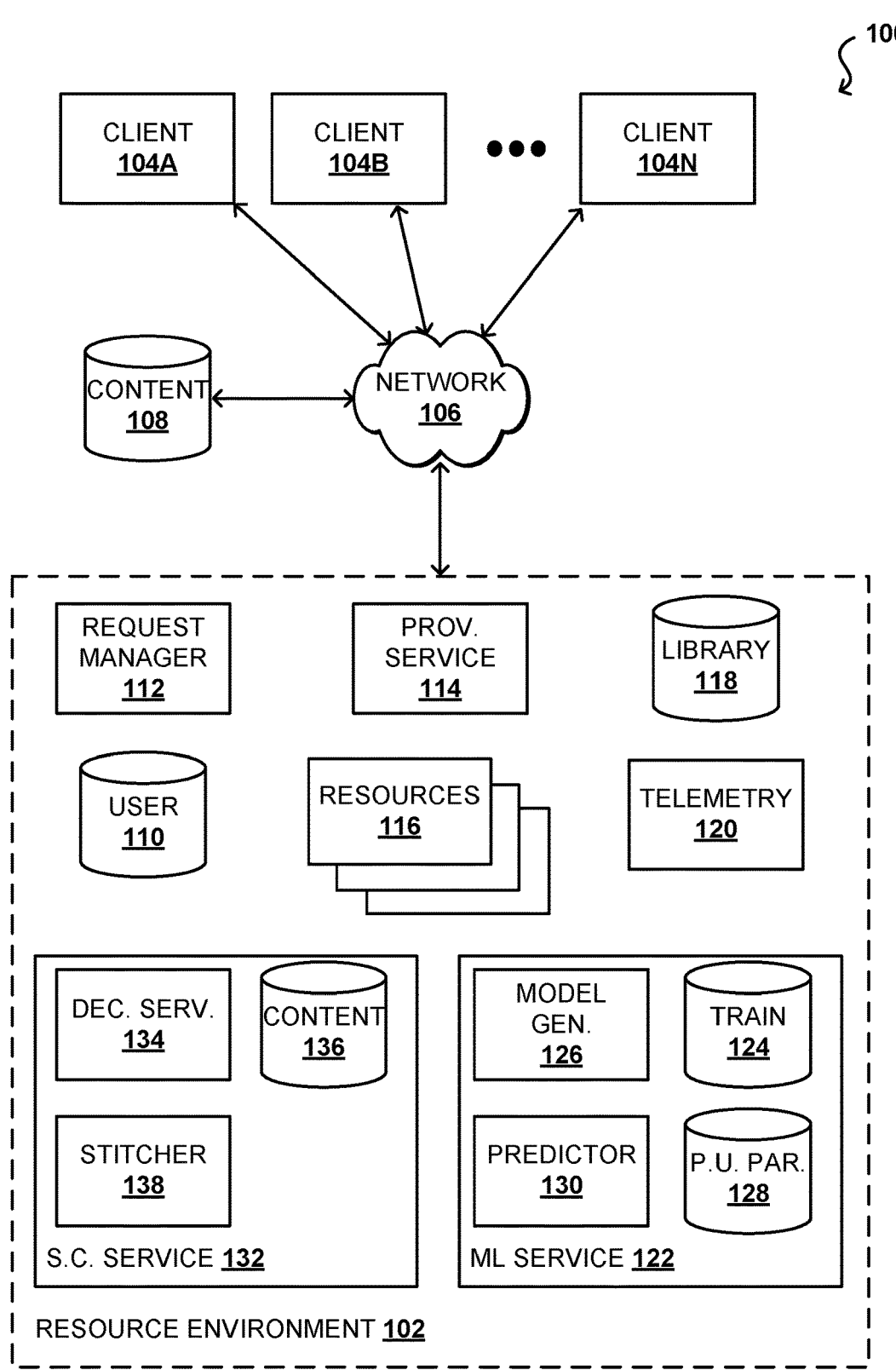
FIG. 1 illustrates an example environment for providing compute resources, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous vehicles or machines (e.g., in an in-cabin infotainment or digital or driver virtual assistant application)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various embodiments are directed toward predicting a duration of time (e.g., a wait time, an idle time, a down time, a processing time, a load time, etc.) between a command to launch an application (e.g., a game, a video, an interaction environment, etc.) and a launch screen for the application. In at least one embodiment, the application may be a cloud-based application where underlying hardware is operated and/or monitored by a resource provider. The resource provider may permit (remote) access to the resources and/or the content in accordance with various user criteria and/or authorization requirements, such as payment of a fee or agreements to execute one or more operations, among other options. The permission may be further provided on a set of tiers, where different tiers may provide access to different resources and/or different content. For example, a "higher" tier may provide access to systems with more powerful processing units or other resources, but at a higher cost. As another example, a "lower" tier may provide access to systems with less powerful processing units or other resources, but may be free in exchange for greater latency and/or performance of various tasks in exchange for use of the resources. By providing different tiers and a variety of different applications, there may be a variety of different loading times or other idle times based on different criteria associated with an initial access request. Systems and methods of the present disclosure may use these loading times, which would otherwise provide a blank screen or some indicator indicative of a loading process to the user, to provide additional content to the user, which may also be referred to as supplemental content, without affecting or otherwise throttling the experience with the requested content. For example, one or more models may be used to predict loading times based on a variety of heuristics that can be gathered by the resource provider with respect to the underlying hardware executing the various operations without querying an application engine itself. In at least one embodiment, memory usage may be tracked over a period of time to identify peaks associated with different predicted operations, such as a launch request, spooling up in response to the launch request, a menu screen, active use, completion of active use, and/or the like. In this manner, models can be used to determine, based on properties known when a session begins such as the underlying hardware that will be used to execute the application, the application being executed, etc., to estimate a wait time prior to reaching an initial menu or some other designated state. This estimated time may then be used by a supplemental content recommender service to select and provide one or more supplemental content elements for presentation to the user during the wait time. By including the supplemental content during an expected wait time, the user experience with the application itself is not affected. Furthermore, the supplemental content may be provided during a period where there is already a delay, rather than artificially throttling the user experience. Models can be generated for different potential configurations of hardware and applications.

Various embodiments of the present disclosure are directed toward overcoming problems associated with artificial throttling and/or progress delays incorporated into various services that enable users to access content remotely. Using the example of an online gaming service, one or more clients may request access to a game that is launched and executed by resources owned by a provider and then streamed for use on a client device. However, in exchange for using the resources and accessing the game, the user may either pay a fee or their experience may be throttled, such as through artificially added loading screens or delaying progression. These delays may be frustrating for the user and may cause a negative sentiment toward both the provider and the content creator, which may cause content creators to be less likely to allow their content on such platforms. Systems and methods of the present disclosure address these problems, among others, by incorporating supplemental content during periods of time where the client would already be waiting (e.g., at states where the client cannot enter commands or otherwise interact with the application), such as while waiting for an initial loading screen, and therefore do not degrade the user experience with the content. Additionally, various embodiments may not need to access the application engine (e.g., game engine) itself to identify states (e.g., game states), but instead, may use heuristics associated with the hardware being used to execute the application to predict different states and estimate times between different states. For example, a resource provider environment may receive a request that includes a selected application and information for the underlying hardware. One or more models may be used to predict a period of time between an initial start of loading (e.g., a session launch) and a ready state (e.g., a menu screen). Because that period of time is already associated (occupied) with loading and likely does not include other content, other than perhaps a loading screen, various embodiments may use that time to provide supplemental content without changing the user experience or interaction with the application engine itself.

Systems and methods may dynamically monitor and update models for different configurations of hardware and requested applications. For example, various embodiments may receive sensor information from one or more underlying resources executing a particular application. This information may be correlated to different application states, such as a first state when an initial request is received, a second state when a menu or landing page is provided, and/or the like. Data may be collected and then models may be developed to predict a duration of time between two states based, at least, on the underlying hardware and the application being executed on that hardware. In this manner, a supplemental content service may then select different supplemental content elements to fill or otherwise efficiently use that duration of time.

Various other such functions can be used as well within the scope of the various embodiments as would be apparent to one of ordinary skill in the art in light of the teachings and suggestions contained herein.

FIG. 1 illustrates an example environment 100 that may be used with embodiments of the present disclosure. In this example, a resource environment 102 may be used to provide access to various resources to execute one or more applications, which may be referred to as a distributed computing environment (e.g., a "cloud" environment) in which the hardware executing the applications is not owned by the client accessing the application, but instead, is owned by a provider that permits access to the resources. Various embodiments may enable one or more clients 104A-104N to submit requests to access resources in order to execute one or more applications using those resources.

In operation, the one or more clients 104A-104N (e.g., users) may submit requests over one or more networks 106 to access (or be provided) content 108, which may be stored remotely from the resource environment 102, but be accessible responsive to one or more requests. Additionally, portions of the content 108 may be stored within the resource environment 102 and/or with an associated accessible resource environment 102. Moreover, different portions of the content 108 may be stored and then deleted as a user interacts with the environment. The clients 104A-104N may be represented by one or more client devices (e.g., client computing devices), which may serve as a proxy to the client/user by making requests responsive to one or more input commands. Additionally, a client may navigate to one or more applications or access points using the device to submit a request, among other options. As another example, a request may be transmitted as part of an automated or semi-automated workflow, which may or may not receive user interaction. Accordingly, one or more client computing devices, associated with the clients 104A-104N may be used with direct input from one or more users, from stored software instructions, from executions of various workflows, or combinations thereof. In various embodiments, the clients 104A-104N submit requests for use of compute resources on behalf of a provider or other service that uses the resource environment 102. For example, a provider may host a website and use the resource environment 102 to provide processing capabilities for one or more interactive features of the website. As a result, requests submitted by the clients 104A-104N may be associated with an account for a provider.

In at least some embodiments, the request can include a request for content to be displayed on a computing device, and in many cases will include video, audio, animations, and/or the like or other media content that is transcoded for presentation on the device. Furthermore, the content may also be interactive so that different commands provided by the user changes the content presentation. The network(s) 106 can include any appropriate network, such as the Internet, a local area network (LAN), a cellular network, an Ethernet, or other such wired and/or wireless network. Furthermore, the resource environment 102 may include any appropriate resources for providing content and/or services from one or more third-party providers that use the services of the resource environment 102, as may include various servers, data stores, and other such components known or used for providing content from across a network. In various embodiments, the client devices can be any appropriate computing or processing device, as may include a desktop or notebook computer, smartphone, tablet, wearable computer (i.e., smart watch, glasses, or contacts), set top box, kiosk, interactive display, or other such system or device.

One or more requests may be submitted over the network 106 to be received at the resource environment 102, for example at an interface layer that may service as a landing page or application program interface (API) to access different resources and/or content elements. User credentials may be checked prior to granting access to the content or resources within the resource environment 102, for example using one or more user datastores 110 that may store user information for a given service associated with the resource environment 102. As noted herein, the user datastores 110 may also be remotely accessible by the resource environment 102 and, as a result, may not be stored within the resource environment 102. The user datastores 110 may be associated with the providers of particular services, the individual clients 104A-104N, and/or combinations thereof. As noted herein, information from the user datastores 110 may be used to determine a tier or service level associated with the requesting client, which may further be used to select a model to predict a load or wait time between different application states. Furthermore, in various embodiments, the user datastores 110 may include information for different clients 104A-104N that may be collected, with permission of the clients 104A-104N, to provide additional information, for example responsive to a profile identifying certain features of the clients 104A-104N.

In at least one embodiment, a request manager 112 receives requests provided to the resource environment 102, for example requests to view and/or interact with content or to execute one or more compute functions, among other options. The request manager 112 may determine, for example using the user datastores 110, whether the request is provided by an authorized entity to perform the functions associated with the request and then may distribute one or more commands to permit access. For example, if the request is a content request, the request manager 112 may receive the request, authenticate the user, and then determine how to satisfy the request, such as by allocating at least a portion of processing capabilities from one or more resources accessible to and/or associated with the resource environment 102.

A provisioning service 114 may receive information from the request manager 112 and/or the initial request provided by the clients 104A-104N in order to provision one or more resources 116 (e.g., resources 116) to start a session associated with the request. The resources 116 may be one or more hardware resources (e.g., processing units, memory units, etc.) that are used to execute one or more cloud-based applications and/or enable interaction with various content elements. As one example, the content 108 requested by the clients 104A-104N may be associated with a video game, and as a result, the resources 116 may be associated with processing units to run one or more game engines and also with memory units to access information associated with the video game, store user progress, and/or the like. Additionally, the one or more resources 116 may be used to provide access to a platform provided by a content creator or partner associated with the content, such as a content store to purchase in-game items and/or to an interaction environment, among various other options.

In at least one embodiment, a library datastore 118 may store information associated with the content 108 and/or with execution of the content using the one or more resources 116. For example, the library datastore 118 may include minimum operating requirements for certain content elements, updates, user progression, and/or the like. The library datastore 118 may also receive and locally store the content 108, in certain embodiments, which may reduce latency or loading times.

In operation, a telemetry service 120 may gather and record information associated with the resources 116 using one or more sensors or data streams. For example, for physical resources, sensors may be associated with operation of those resources, such as a temperature of the resources, flow characteristics for liquid-cooled systems, fan speeds, and/or the like. Additionally, sensor information and/or data streams may be associated with properties of the resources, such as a load applied to a processing unit (e.g., a determination of a percentage of total processing capability used), a memory use, and/or the like. In at least one embodiment, certain metrics may be tracked that are associated with latency or other indicators that the one or more resources 116 are operating at or near a threshold capacity. This information may be recorded continuously and/or at intervals (e.g., every second, every several seconds, etc.) in order to monitor and dynamically adjust operations for the one or more resources 116. As noted herein, the information from the telemetry service 120 may be associated with particular parameters of the one or more resources 116 and/or the information from the library datastore 118 associated with the application in order to estimate different states.

In at least one embodiment, data collected by the telemetry services 120 may be correlated to characteristics of the associated system. For example, the information collected may be associated with properties of the underlying resources and the application being executed. This information may be stored and aggregated as multiple users make requests using the same or substantially similar configurations. Over time, this information may be used to make predictions associated with different game states, as described herein, and may be stored in one or more datastores.

Systems and methods of the present disclosure may incorporate one or more machine learning (ML) services 122 to collect information acquired by the telemetry service 120 and to generate one or more models to predict state information based, at least, on parameters of the underlying resources and/or information associated with the applications and/or content being executed by the underlying resources. The telemetry information may be stored, along with information of the associated applications/content, in one or more training datastore(s) 124 and used by one or more model generators 126 to create one or more models, which may further be stored in a model datastore 128, for a predictor 130 to execute the model using information associated with the request in order to predict one or more durations of time associated with loading or waiting that may be used to provide supplemental content to a requesting user. For example, the training datastore 124 may include metrics associated with processor temperatures, memory use, and/or the like for specific configurations associated with resource parameters and/or application parameters. Information for a number of users may be aggregated and then used to generate one or more models. For example, an average duration between a request to load and rendering of a load screen may be determined and may be associated with a load time where supplemental content may be provided. In this manner, particular models may be built for known or predicted configurations, thereby increasing accuracy of the predictions. By way of example, for a gaming service, there may be a certain number of games and a certain number of resource configurations. Therefore, a model can be generated for each configuration (or for the most popular ones) to enable determination of loading or wait times. Various embodiments may be performed in real and/or near-real time to generate different predictions and/or models. For example, when a new application is added, there may be a delay prior to adding supplemental content to wait times while sufficient information is collected, but after a period of time, a prediction having a threshold confidence may be generated, tested, and then stored.

Upon determination of the durations of time to provide supplemental content to different units, a supplemental content service 132 may be used to select different content elements to provide during the wait time. For example, a decision (or recommender) service 134 may receive information associated with the wait time and then select, from a supplemental content datastore 136, one or more supplemental content elements that may be stitched together by a stitching service 138 and provided for insertion into the content stream provided by the one or more resources 116. In at least one embodiment, the content elements may be personalized to the user, for example, based on user profile information, the application being launched by the user, and/or the like. Furthermore, in various embodiments, content elements may be selected to fit within the wait time in accordance with one or more parameters associated with the content. For example, it may be undesirable to provide a content element that will not finish within the wait period. In this manner, supplemental content may be provided to users during wait times that would otherwise include no content, thereby providing an opportunity to serve the additional content without affecting the user experience associated with the selected application.

Embodiments of the present disclosure may be used to address and overcome problems with existing systems where a client experience may be throttled or otherwise artificially limited due to the use of supplemental content. For example, a loading time may be increased to provide supplemental content or progress may be delayed artificially until supplemental content is viewed or an action is undertaken. These approaches may frustrate clients to the point where they reduce or avoid using the services and/or contents. Furthermore, when a service provider and a content creator are different, the content creator may not want their content associated with supplemental content, at least not in a negative way such as artificial throttling and delay, which may cause problems between the service provider and the content creator. Systems and methods are directed toward determination of delay or wait times that would already accompany the provision of the selected content/application to the client. These wait times may be estimated based on properties of the underlying hardware, instead of accessing a game or video engine to directly pull state information, thereby reducing interaction with the content and allowing the service to be used over a wider range of applications. Moreover, embodiments may particularly select supplemental content to fit within a given duration of time, thereby reducing a likelihood that the supplemental content extends beyond the duration of time and/or is not viewed.

Furthermore, systems and methods of the present disclosure may enable one or more providers to receive compensation for providing resource services and, as a result, may permit the provider to offer the services at a reduced cost or free of charge. For example, the provider may offer tiers of service, where a lower tier may have longer wait times, due to using less powerful hardware, but may have a lower cost or be free. Additionally, in certain embodiments, users may be provided with opportunities to upgrade their services responsive to viewing or interacting with supplemental content. The user may be provided with an option, such as a choice to view additional content in exchange for using a higher tier of service. The user's selection may then be used to modify or change the wait time.

FIG. 2 illustrates an example configuration 200 illustrating a number of different states 202 associated with an application, such as a video game, a content creation platform or application, an interaction environment, and/or the like. In this example, the states 202 may correspond to different moments or markers associated with the application. These states may be derived from an application engine, however, various embodiments of the present disclosure may also infer or predict states based on one or more metrics associated with the underlying hardware used to execute the application. As a result, predictions associated with those states 202 may be developed without receiving or obtaining access to the underlying application engine.

The states 202 shown in the configuration 200 are arranged along a time axis 204 arranged chronologically from left to right. In this example, a first state 202A is shown, which may be associated with receiving a client command 206A to launch or start a session for the application. For example, the initial request may be to begin loading a video game from a game library, where the request includes an identification of a tier of service provided to the requestor, the game itself, and/or additional information. In various embodiments, it may take time to both provision the resources and to load the application associated with the client command 206A. The time may be dependent, at least in part, on the underlying hardware selected for the task, availability of the underlying hardware, availability of application services, complexity of the application, and/or various other factors. At a second state 202B, a menu for the application is provided for viewing to the client. The menu may be a launch page for a video game or other application, such as one where the user may access a menu to select parameters for an instantiation of an application, start a new instantiation, access a saved instantiation, and/or the like. A second client command 206B may then launch the application itself, for example a command to start a new instantiation of the application at a third state 202C. This may be referred to as an active period where multiple client commands 206C may be received associated with interactions with the application, such as a user inputting controls, requesting saves, viewing cutscenes, and/or other features associated with a game. At a fourth state 202D, the game may be finished, for example by starting a series of end credits. While the game may still be executing at this time, user interaction may be limited. Finally, a fifth state 202E may correspond to an end state in which the session is disconnected or returned to a main screen to enable selection of another application or to exit the service. Furthermore, in various embodiments, additional intermediate states may also be included, for example if the user finished the game or exits the session prior to completion.

Embodiments of the present disclosure may identify one or more states 202 without querying or otherwise accessing the application engine, which may increase a number of applications that are compatible with the various methods discussed herein. In at least one embodiment, one or more metrics may be associated with or otherwise correlated to the different states 202. That is, systems and methods may aggregate information, such as sensor information, in order to identify one or more states 202 that may be used to identify a period of time where supplemental content may be presented without degrading or otherwise affecting interaction with the application itself. The states may, instead, be associated with information obtained from the underlying hardware used for execution. In other words, the supplemental content may be provided during a loading state in which the application would be inaccessible to the user in normal operations, and as a result, presentation of the supplemental content would not interfere with the use of the application itself.

An example load schematic 210 is illustrated correlating a load, such as a load to one or more processing units or memory use, to different states 202. In this example, a line 212 represents the load applied to one or more processing units and/or memory units responsive to execution of different applications, such as video games or various other cloud-based applications. The load may be associated with one or more metrics acquired via telemetry or other data acquisition. For example, the load may be associated with memory usage. In another example, the load may be a temperature of one or more processors of a system during an operation state. In a further example, the load may be a fan speed or flow information for cooling solutions. Additionally, in various embodiments, the load may be a collection of different metrics, which may be weighted or otherwise combined, in order to predict an operating state of the application based on properties that may be acquired directly from the one or more resources associated with the application, and as a result, may reduce or eliminate a need to query or otherwise obtain access to different application engines.

In this example, line segment 212A corresponding to the load gradually increases over a first duration 214A, which corresponds to a period of time between the first state 202A and the second state 202B. During this period of time, one or more processing units may be preparing to load a selected application, such as a game, and may also be performing other activities associated with the loading, such as finding an available session, provisioning appropriate resources, and/or the like. As shown, the line segment 212A has an initial increase and then levels off prior to the second state 202B, which may correspond to providing a menu to the user, for example for a video game.

In at least one embodiment, different features of the line segment 212A may correspond to or otherwise be correlated with different actions of the processing units. For example, a sudden increase may correspond to an initial operation to begin executing a command while a gradual smoothing or flattening of the line segment 212A may illustrate execution of a particular process over a period of time. In at least one embodiment, these different correlations may be used to establish one or more thresholds 216 in order to identify different states. For example, a threshold 216A may be associated with a menu being loaded for a particular application. Accordingly, identifying a duration of time that the line segment 212A is within a threshold value of the threshold 216A for processing may be used to make a determination that the second state 202B has begun. As such, a value for the first duration 214A may be computed, which may then be used to provide supplemental content to users during the first duration 214A at least because during that period of time, the user cannot interact with the application as the load screen or other landing page has not yet loaded.

In various embodiments, the magnitude of the first duration 214A may be dependent, at least partially, on various properties associated with providing access to the application, including the underlying hardware capabilities, execution parameters of the application, settings provided by the client, and/or the like. By way of example, if the client is loading a high-end video game and requests ultra-high definition graphics, the underlying hardware will require greater power (e.g., more processing capability) in order to provide content using these parameters without significant latency. However, in various embodiments, the client may be associated with a tier or service level in which the associated hardware is unable to meet these settings without delay. As a result, the user may be subjected to longer wait times (e.g., a greater period of time for first duration 214A) because of their desired application and/or settings. In at least one embodiment, a client on a higher tier may have a smaller first duration 214A because their underlying hardware may be more powerful and/or their settings may enable faster loading. Accordingly, systems and methods may be used to determine unique determinations of the first duration 214A based, at least in part, on the set of parameters associated with the first duration 214A. That is, different combinations of underlying hardware, applications, settings, and/or the like may be monitored, evaluated, and used to predict the first duration 214A.

Systems and methods of the present disclosure may be used to identify the various states 202 and then provide supplemental content at appropriate times, such as times where a client may be unable to interact with the application, which may include waiting for an application to load initially, loading times within the application, after completion of the application, and various other intermediate times. Accordingly, a variety of different durations 214B-214D and thresholds 216B-216D may be determined by monitoring telemetry information associated with the various line segments 216B-216D in order to identify various states 202B-202D without and/or with limited access to an underlying application engine. In this manner, cloud-based applications may be monitored and correlated to different underlying hardware configurations to predict periods of time in which supplemental content can be provided without artificially throttling or otherwise affecting a client's interaction with the application.

Various embodiments of the present disclosure may monitor a collection or group of different users or clients that initiate various configurations associated with different underlying hardware and applications in order to predict a specific duration for a given configuration. An example load schematic 220 illustrates a number of different line segments 222A-222D corresponding to different loads applied to one or more processing units and/or memory units prior to reaching a respective end state 224A-224D, which may correspond to a loading screen, landing page, or any other defined state in which a user may interact with one or more applications. In this example, a common application may be evaluated with a common end state (e.g., the same game with the same loading screen), but with different underlying hardware. For example, hardware may have different processing capabilities, different memory allocations, and/or the like and, as a result, may be capable of executing different operations at different speeds. In this example, the first state 202A corresponds to an initial input command to start or otherwise go to the respective end states 224A-224D. Based on the processing capabilities, the various end states 224A-224D may be reached with different durations 226A-226D, as illustrated by the line segments 222A-222D representative of the various loads associated with the processing units. Such information may be collected over a period of time or for a threshold number of executions/loads and then may be stored, for example in a database. The information may be used to train one or more machine learning systems to predict different durations of time where supplemental content may be presented to various users. Furthermore, in at least one embodiment, information may be collected to determine an average or expected duration for a given configuration and that average may be used to provide supplemental content.

Figure 3:
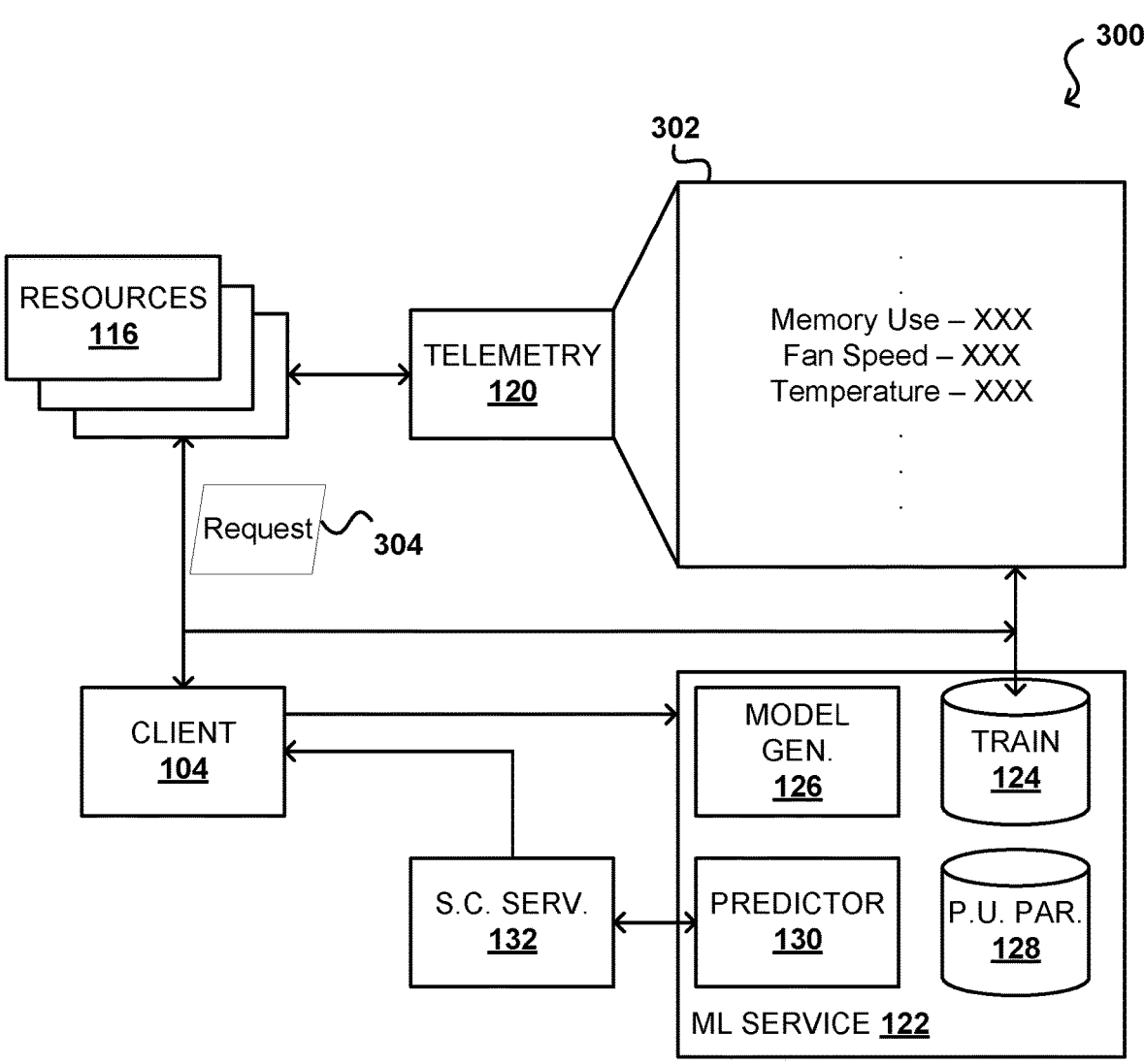
FIG. 3 illustrates an example environment for collecting telemetry information to predict state changes, in accordance with various embodiments.

FIG. 3 illustrates an example environment 300 that may be used with one or more embodiments of the present disclosure. In this example, the telemetry service 120 collects information 302 (e.g., sensor information) from the one or more resources 116 responsive to executing one or more requests 304 submitted by the client 104. As noted herein, the request 304 may correspond to loading one or more cloud-based applications that will execute using the one or more resources 116. In at least one embodiment, the request 304 may include information such as an application to be executed, specifications for execution, and one or more resources to execute the application. The one or more resources may be selected by the client 104 and/or dictated by information associated with the client 104, such as a service tier for the client. For example, a client on a high(er)

service tier may receive access to faster processing units, faster memory, etc. when compared to a low(er) service tier. This information associated with the request 304 may then be correlated to the information 302 collected by the telemetry service 120, which may be used by one or more ML services 122 and/or to predict a duration of time to provide supplemental content.

For example, in at least one embodiment, the information may be collected for a number of clients having the same configuration as the client 104 (e.g., same service tier, same application, etc.) and a duration of time between different game states may be determined based, at least in part, on the collected telemetry information. For example, different data from the information 302 may be associated with various states. In at least one embodiment, it may be determined that an initial landing or loading screen is reached at a point when an initial ramp up or heavier use for a given processing unit is complete. Additionally, or in the alternative, the information 302 may be used to train one or more machine learning systems to generate one or more models to predict different durations between game states. These predictions may be provided to the supplemental content service 132 to provide supplemental content to the client 104 between various states, such as between an initial request to launch an application and a change in state, such as a menu screen. In this manner, supplemental content may be provided during periods of time that do not alter use of the application, because those periods of time are associated with loading.

FIG. 4 illustrates an example environment 400 that can be used with embodiments of the present disclosure. In this example, the predictor 130 provides information associated with a duration of time between a first state (e.g., a request to launch) and a second state (e.g., an initial launch state, such as a menu screen) in which the supplemental content service 132 may provide one or more supplemental content elements to the client 104 making the request. As noted herein, providing supplemental content at this time does not affect or otherwise change the operation of the application, and moreover, may not require access to application state information through the application engine because state information may be inferred and/or determined based on telemetry information acquired from underlying resources, as described herein. In this example, the decision service 134 selects different content elements 136, which may be stitched together using the stitching service 138. The stitching service 138 and/or the decision service 134 may select different content elements based on an available time (e.g., the duration minus some threshold quantity of time, the duration, etc.). By way of example only, a content sequence 402 is illustrated in which a duration 404 is provided between the first content state 202A and the second content state 202B. In various embodiments, it may be desirable to include a cushion or time gaps to account for variables, which may be added before or after the insertion of the content, such as the gaps 406A, 406B. The gaps 406A, 406B may vary in duration and may be based on various factors and condition, such as latency, processing times, and/or the like. In at least one embodiment, the gaps 406A, 406B may be determined as a percentage of the duration 404, as a set value, or by any other reasonable approach.

In this example, each supplemental content element 408A-408D has a respective duration 410A-410D, where one or more durations 410A-410D may be different from others. In various embodiments, it may be desirable to have a cumulative duration for selected content elements be less than the duration 404 and/or less than the duration 404 minus the gaps 406A, 406B. For example, various entities associated with supplemental content may pay a fee to include the content, but only to the extent that certain portions are viewed (e.g., the entire duration, a threshold duration, etc.). Accordingly, it may be undesirable to include a supplemental content element that will not satisfy the associated criteria during the duration 404. By way of example, the supplemental content element 408D extends beyond the second state 202B by a duration 412. As a result, it may be preferable to not include supplemental content element 408D in the content sequence 402 and include a larger gap 406B and/or include a message or other indicator during the gap 406B to the client, for example informing them of an expected time until their application begins. However, in certain embodiments, the duration 404 may be extended by moving the second state 202B to a different time when the supplemental content element 408D completes. In various embodiments, systems and methods may deploy the stitching service 138 along with the decision service 134 to select different content elements from the datastore 136 in order to both appeal to the user (e.g., by accessing user information) and/or to fit within the given duration 404.

FIG. 5A illustrates an example flow chart for an example process 500 to determine a time period for supplemental content presentation that may be used with embodiments of the present disclosure. It should be understood that for this and other processes presented herein that there can be additional, fewer, or alternative operations performed in similar or alternative order, or at least partially in parallel, within the scope of various embodiments unless otherwise specifically stated. In this example, a time period between a session launch and a ready state for a computing task is determined 502. In various embodiments, the computing task may be associated with a distributed computing session in which a client requests execution of one or more applications using underlying hardware that is rented or otherwise not owned by the client. The session launch may correspond to an action undertaking responsive to one or more requests to launch an application, to provision resources, and/or combinations thereof. Furthermore, the ready state may be a state of operation of the application where one or more client inputs may be received to cause one or more actions or tasks to be executed.

In at least one embodiment, supplemental content may be generated 504. The supplemental content may include a plurality of content elements, which may be selected based on various factors, such as properties or information associated with the client making the initial request to access the resources. The plurality of content elements may each have a duration of presentation, which may be different between the different content elements. The supplemental content elements may be selected such that their aggregated duration is less than the time period. The supplemental content may then be provided for presentation during the time period 506. In this manner, content may be provided prior to the ready state when the client would otherwise be waiting for the application to load, thereby seizing an opportunity to provide supplemental content without affecting the user interaction with the underlying application.

FIG. 5B illustrates an example flow chart for an example process 520 to generate supplemental content for presentation, that may be used with embodiments of the present disclosure. In this example, one or more performance parameters for a distributed computing session are determined 522. The performance parameters may correspond to one or more properties of the underlying hardware resources uses to execute an application associated with the distributed computing session, such as memory use, temperature, and/or the like. Furthermore, performance parameters may also be associated with the application itself, where different configuration settings of the application may influence or otherwise affect the performance parameters. In at least one embodiment, an estimated delay time between a session launch and a ready state for the distributed computing session is determined 524. The delay time may correspond to a period of time where the client is waiting for use of the application and cannot input commands or otherwise use the application, such as waiting for a game to load or waiting in a lobby, among various other options. This period of time may vary based on the capabilities of the underlying hardware executing the application, where more powerful hardware may have a shorter delay time than less powerful hardware.

In various embodiments, supplemental content having a duration of presentation less than the estimated time delay may be determined 526. For example, a content database may be accessed to identify different content elements that may be combined as the supplemental content. The supplemental content may then be provided for presentation during the estimated time delay 528. In this manner, supplemental content is identified and selected based on the time delay estimate.

FIG. 5C illustrates an example flow chart for a process 540 for selecting supplemental content for inclusion within a supplemental content sequence. In this example, a time period between a first state and a second state is determined, based on operating parameters for a distributed computing session 542. The first state and the second state may correspond to a session launch and an initial ready state, such as a request to launch an application and a menu or landing page for that application. A set of supplemental content elements may be determined 544, for example from a content datastore or based on user information, among other options. A selected supplemental content element may be selected from the set 546 and a duration of a supplemental content sequence, including the selected supplemental content element, may be determined 548. In various embodiments, the supplemental content sequence may include multiple supplemental content elements.

The duration of the supplemental content sequence may be determined and compared to the time period to determine whether or not the duration exceeds the time period 550. If not, the selected supplemental content element may be added to the supplemental content sequence 552. If the duration does exceed the time period, then the selected supplemental content element may not be added to the supplemental content sequence and a determination may be made whether or not additional supplemental content elements remain within the set 554. If so, additional supplemental content elements may be elected and their respective additions to the duration may be evaluated. If there are no remaining supplemental content elements in the set, then the supplemental content sequence may be provided for presentation during the time period 556.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
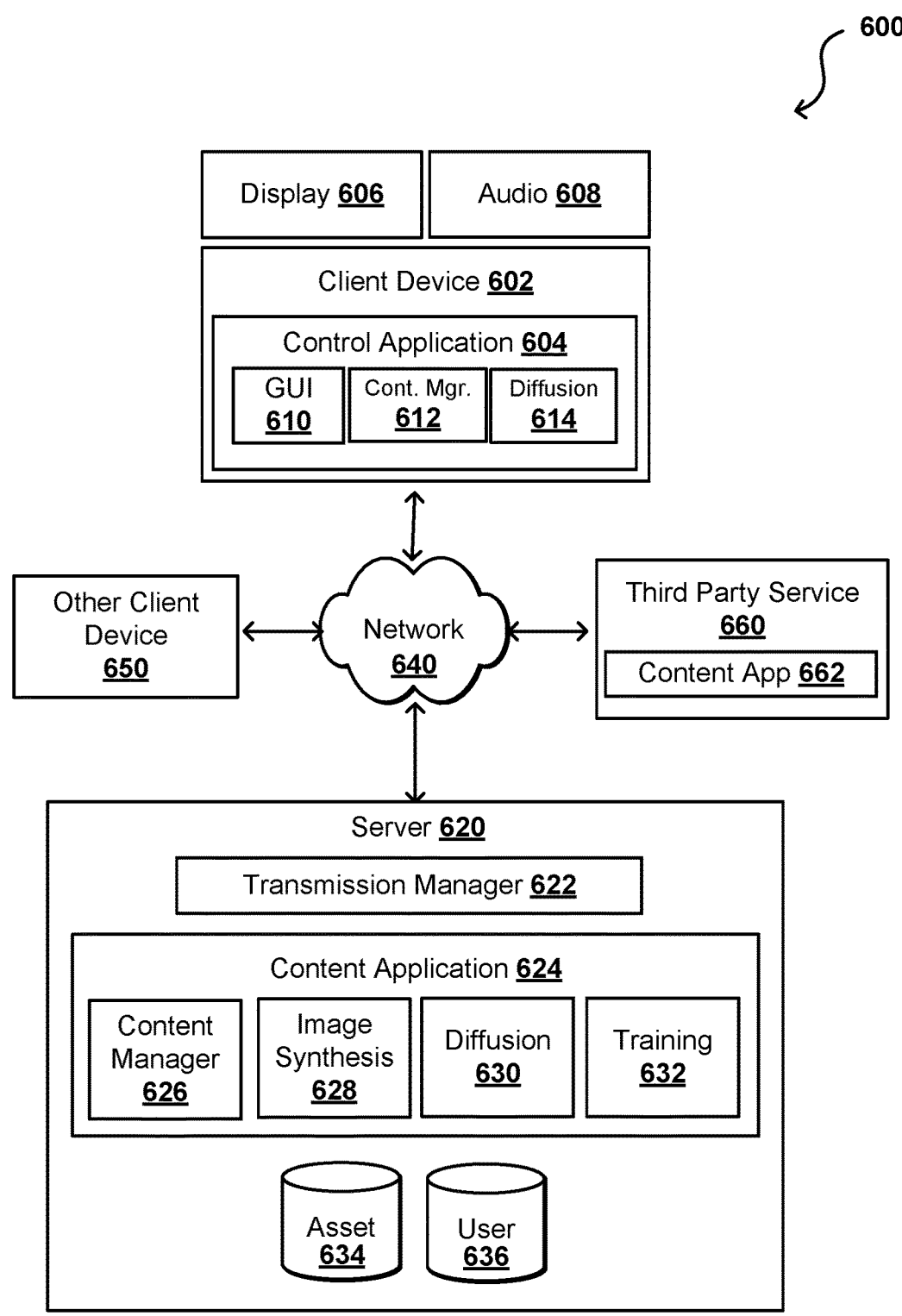
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
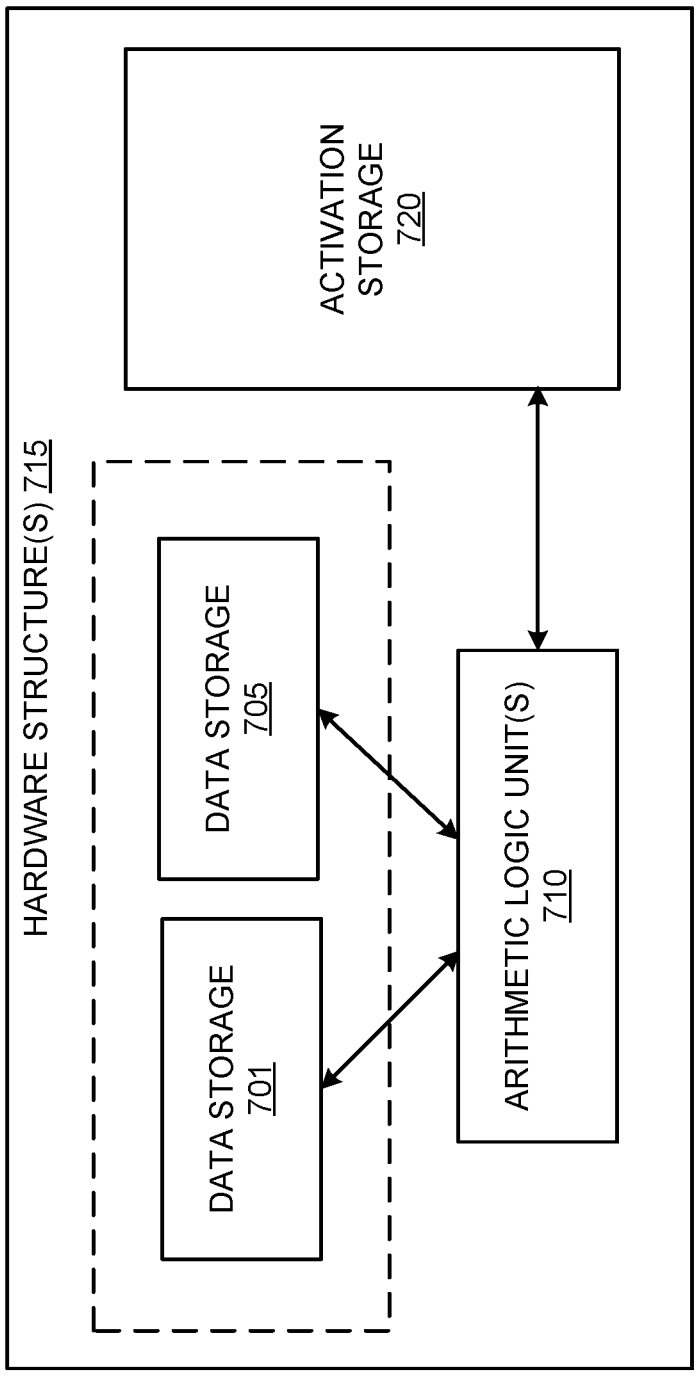
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware, or other hardware, such as field programmable gate arrays ("FPGAs").

Figure 7B:
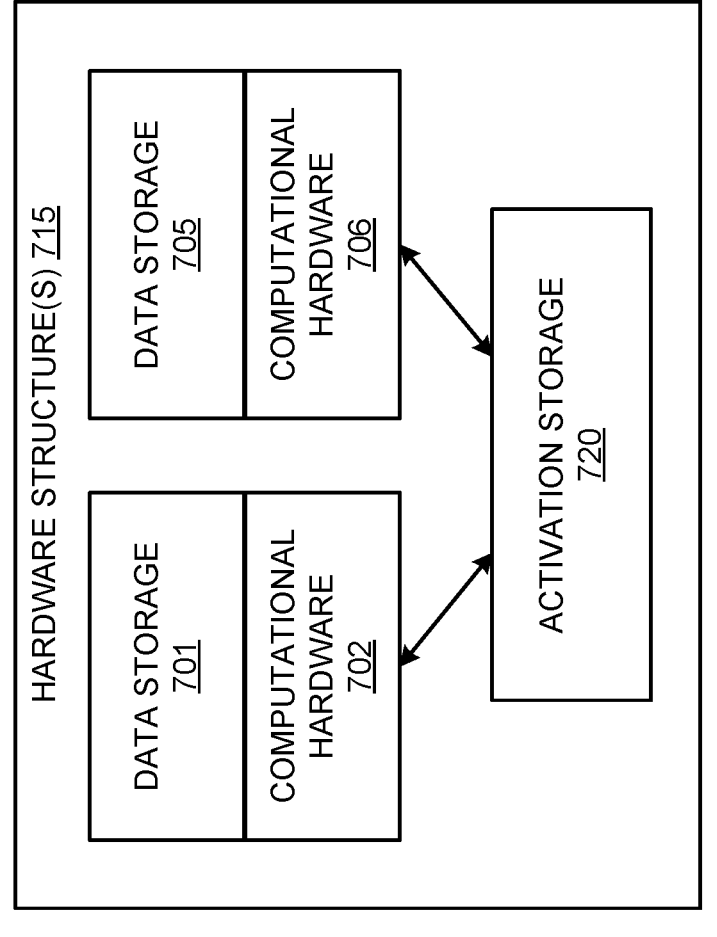
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
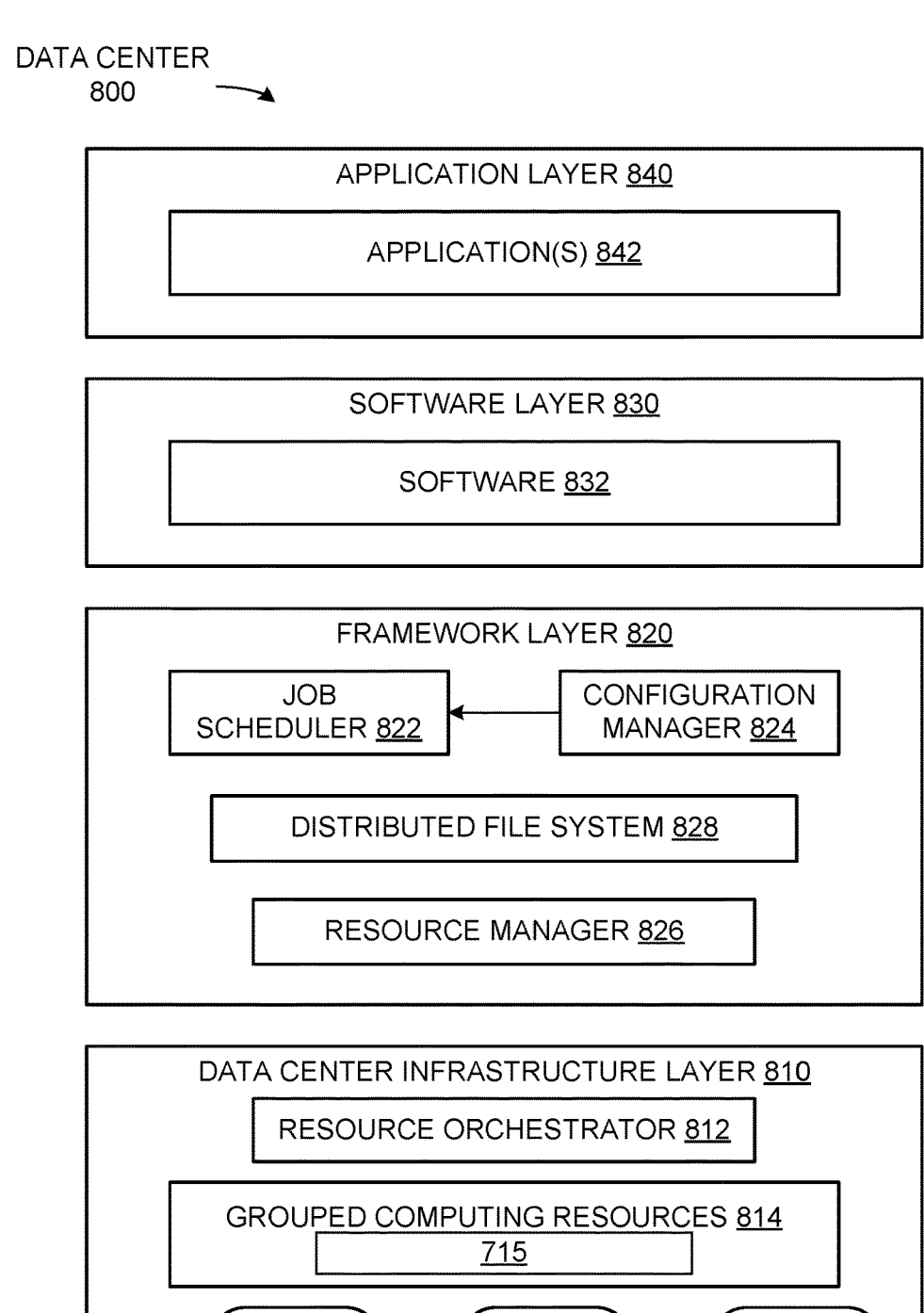
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for evaluating operating parameters and providing supplemental content elements.

Computer Systems

Figure 9:
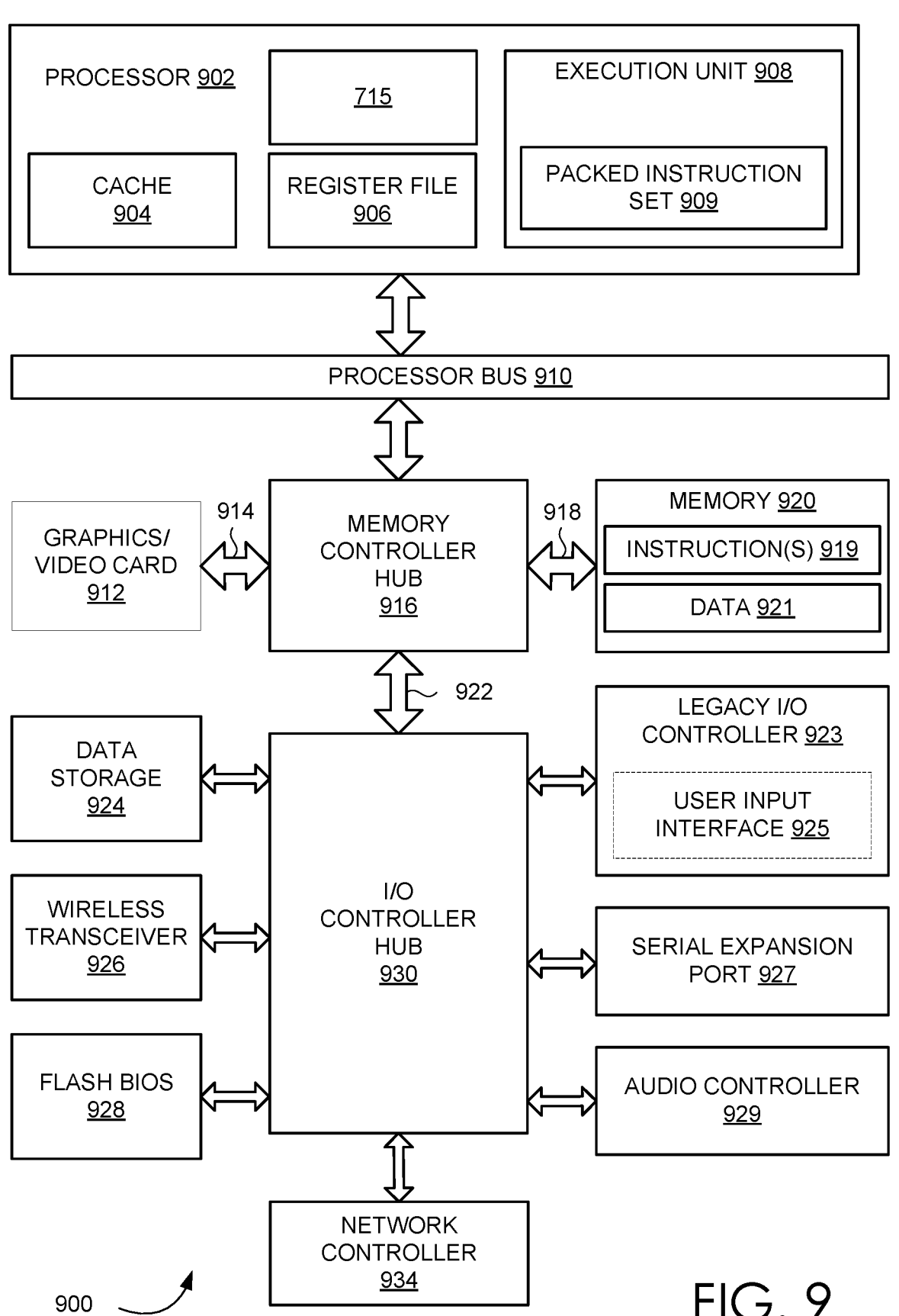
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for evaluating operating parameters and providing supplemental content elements.

Figure 10:
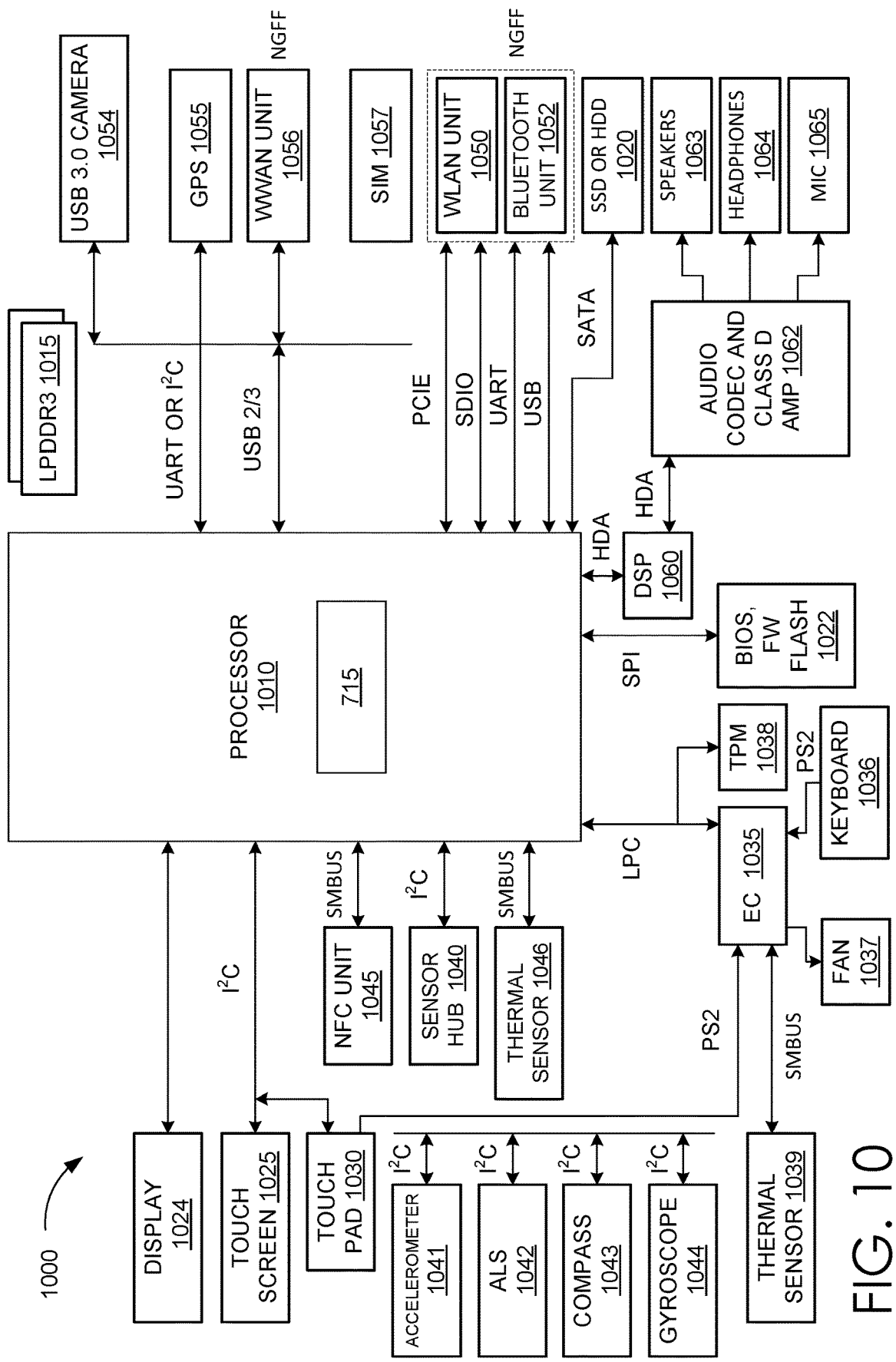
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for evaluating operating parameters and providing supplemental content elements.

Figure 11:
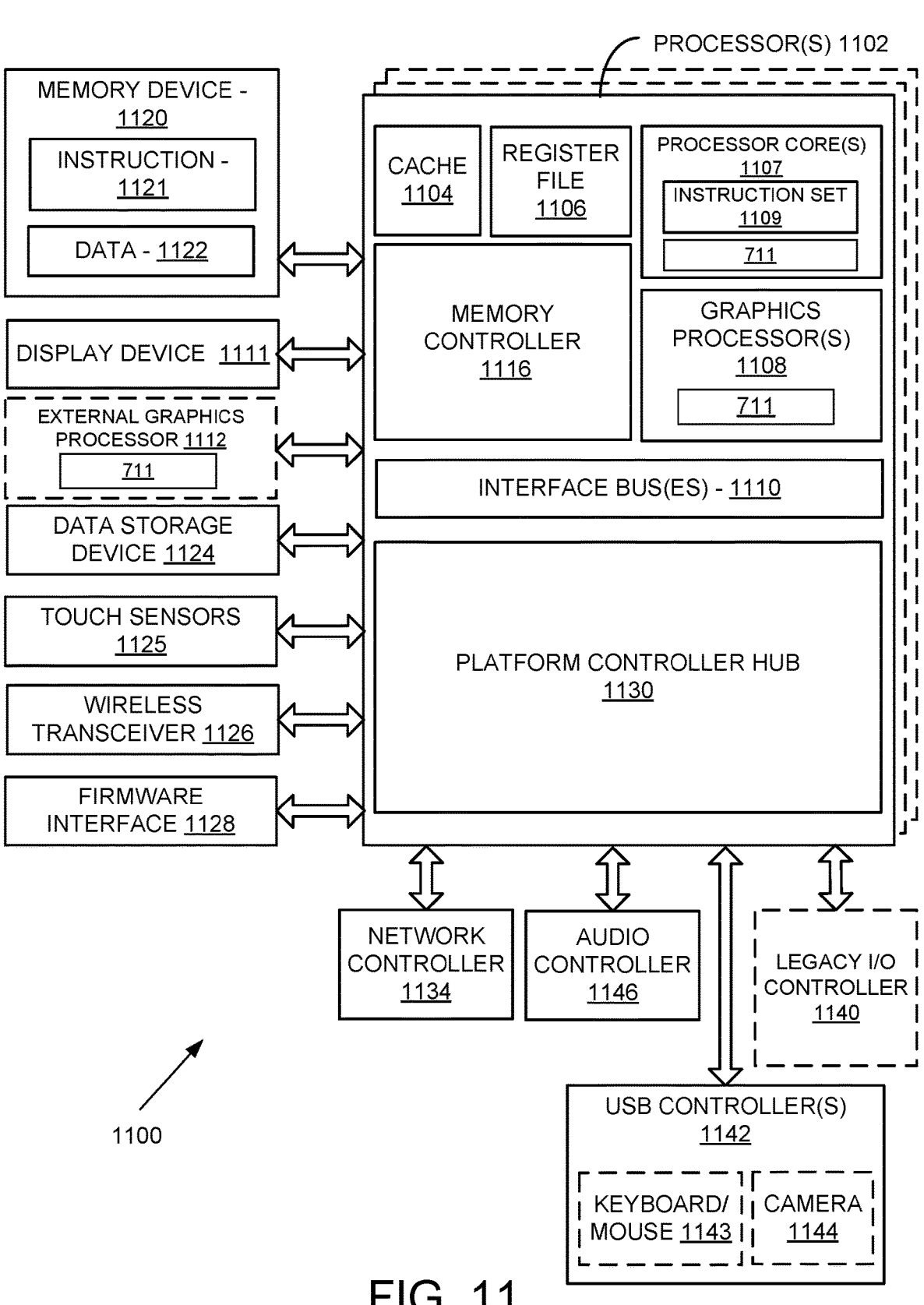
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor(s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for evaluating operating parameters and providing supplemental content elements.

Figure 12:
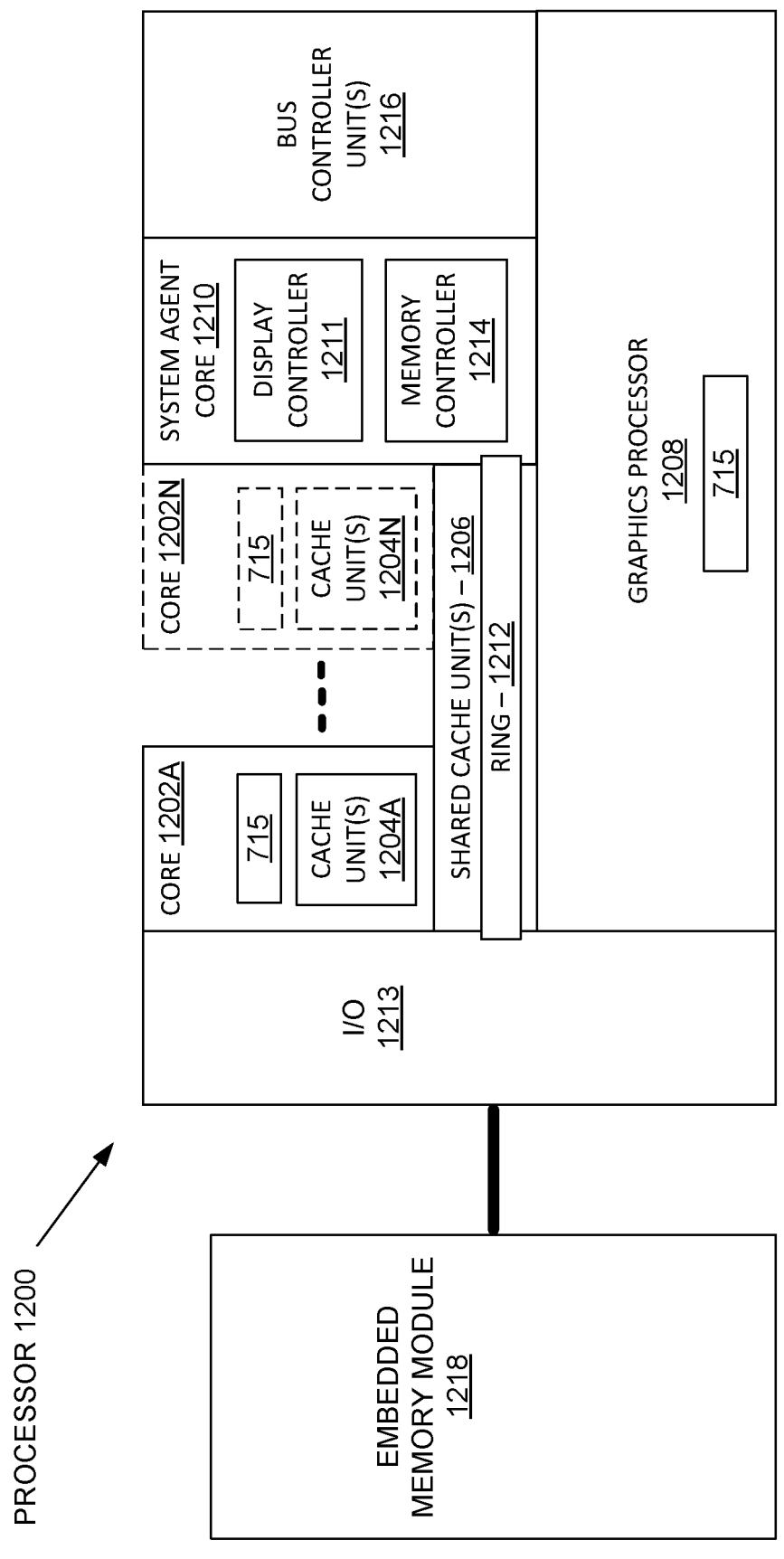
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for evaluating operating parameters and providing supplemental content elements.

Virtualized Computing Platform

Figure 13:
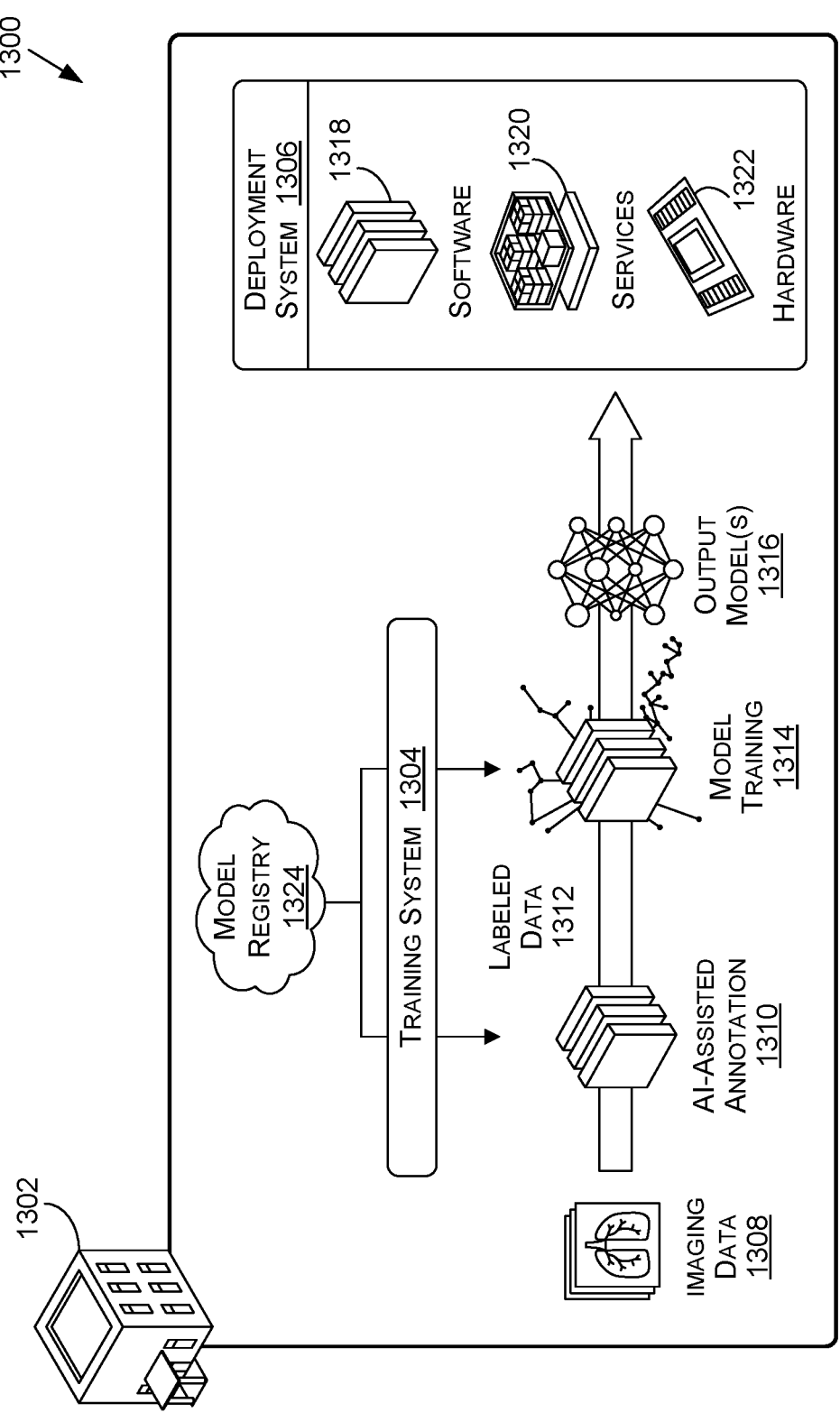
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/ or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
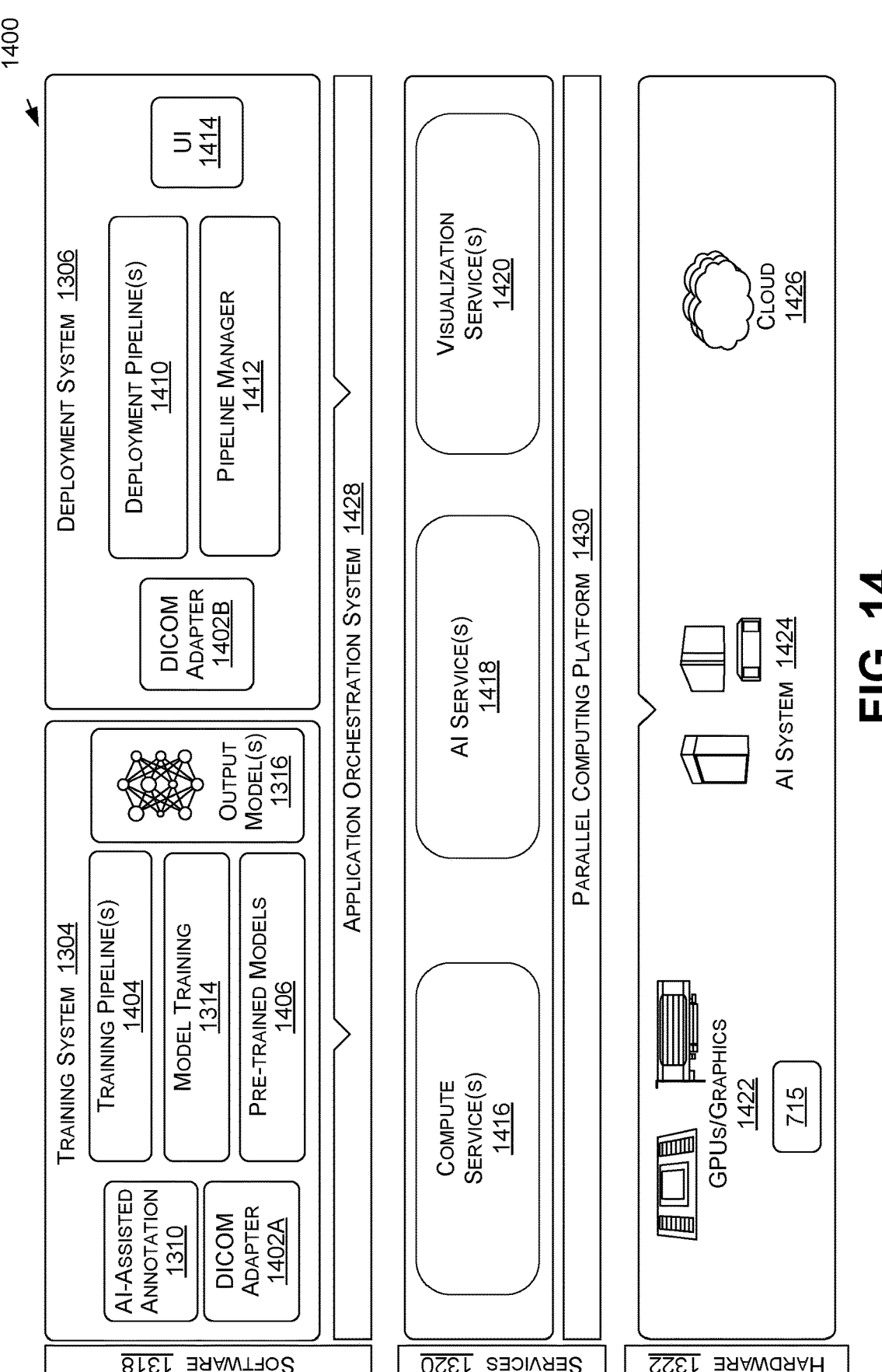
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422.

In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
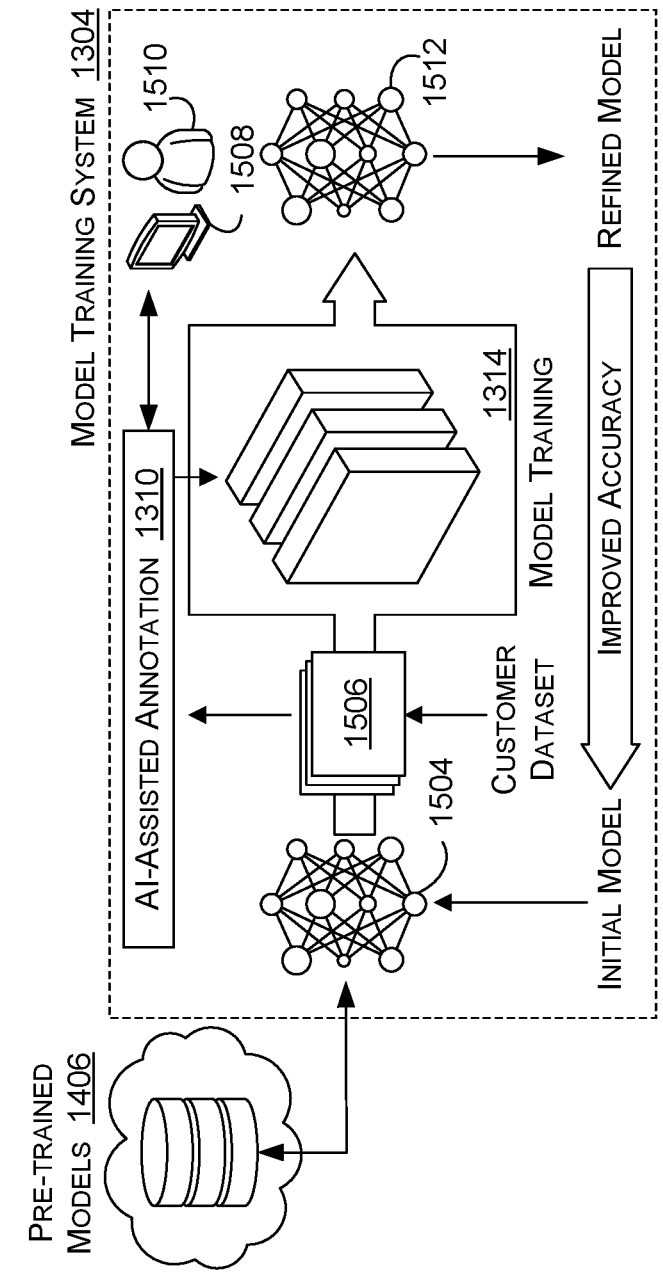

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
determining one or more performance parameters for a distributed computing session;
calculating, based at least on the one or more performance parameters, an estimated delay time between a session launch and a ready state for the distributed computing session;
determining supplemental content having a duration of presentation that is less than the estimated delay time; and
providing the supplemental content for presentation between the session launch and the ready state.

2. The computer-implemented method of clause 1, wherein the one or more performance parameters include at least one of one or more underlying hardware features of one or more computing systems used to execute the computing session, a software application associated with the distributed computing session, or one or more features associated with the software application.

3. The computer-implemented method of clause 1, further comprising:
selecting, from a model database, a first model based at least on the one or more performance parameters and a software application associated with the distributed computing session, wherein the delay time is estimated using the first model.

4. The computer-implemented method of clause 1, wherein the estimated delay time corresponds to a period in which with at least one of one or more interactive features or one or more graphical features of an application associated with the distributed computing session is inaccessible to a client.

5. The computer-implemented method of clause 1, further comprising:
receiving a first heuristic for a hardware component executing the distributed computing session;
identifying one or more action events during the distributed computing session; and
training a machine learning system based at least on the one or more action events and the first heuristic.

6. The computer-implemented method of clause 5, wherein the first heuristic is at least one of memory consumption, a temperature value, or a processor load.

7. The computer-implemented method of clause 1, wherein the session launch and the ready state are determined without accessing an application engine associated with an application executing during the distributed computing session.

8. The computer-implemented method of clause 1, wherein the supplemental content includes a plurality of content elements.

9. A processor, comprising:
one or more circuits to:
determine a time period between a session launch and a ready state for a distributed computing session based at least on one or more operating parameters for the distributed computing session;
generate, for the time period, supplemental content including a plurality of supplemental content elements that cumulatively have a duration of presentation that is less than the time period; and
provide the supplemental content for presentation during the time period.

10. The processor of clause 9, wherein the one or more operating parameters include at least one of underlying hardware features for the computing session or one or more features corresponding to a software application associated with the distributed computing session.

11. The processor of clause 10, wherein the time period is determined without accessing a software application engine.

12. The processor of clause 9, wherein one or more of the operating parameters are determined based on user information for a user requesting access to the distributed computing session.

13. The processor of clause 9, wherein the one or more circuits are further to:

receive a first heuristic for a hardware component executing the distributed computing session;

identify one or more action events during the distributed computing session; and train a machine learning system to infer an output corresponding to the first heuristic based, at least in part, on the one or more action events.

14. The processor of clause 9, wherein the processor is comprised in at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system for performing one or more generative content operations using a large language model (LLM);

a system implemented at least partially in a data center;

a system for performing hardware testing using simulation;

a system for performing one or more generative content operations using a language model;

a system for synthetic data generation;

a collaborative content creation platform for 3D assets; or a system implemented at least partially using cloud computing resources.

15. A system, comprising:

one or more processing units to predict a time period between a session launch and a ready state for a distributed computing session based at least on a hardware configuration executing the distributed computing session and one or more processing tasks to be executed during the distributed computing session, wherein the one or more processing units provide supplemental content for presentation during the time period prior to user operation of the distributed computing session.

16. The system of clause 15, wherein the distributed computing session corresponds to a gaming session executed on an underlying graphics processing unit (GPU).

17. The system of clause 16, wherein the one or more processing units are further to determine at least one of a memory usage or a temperature of the GPU.

18. The system of clause 15, wherein the hardware configuration is associated with a user submitting a request for the distributed computing session.

19. The system of clause 15, wherein the time period is determined without accessing a software application engine associated with the distributed computing session.

20. The system of clause 15, wherein the system is one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system for performing one or more generative content operations using a large language model (LLM);

a system implemented at least partially in a data center;

a system for performing hardware testing using simulation;

a system for performing one or more generative content operations using a language model;

a system for synthetic data generation;

a collaborative content creation platform for 3D assets; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more circuits to:
    determine a time period between a session launch and a ready state for a distributed computing session based at least on one or more operating parameters for the distributed computing session;
    generate, for the time period, supplemental content including a plurality of supplemental content elements that cumulatively have a duration of presentation that is less than the time period; and
    provide the supplemental content for presentation during the time period.

2. The processor of claim 1, wherein the one or more operating parameters include at least one of underlying hardware features for the computing session or one or more features corresponding to a software application associated with the distributed computing session.

3. The processor of claim 2, wherein the time period is determined without accessing a software application engine.

4. The processor of claim 1, wherein one or more of the operating parameters are determined based on user information for a user requesting access to the distributed computing session.

5. The processor of claim 1, wherein the one or more circuits are further to:
    receive a first heuristic for a hardware component executing the distributed computing session;
    identify one or more action events during the distributed computing session; and
    train a machine learning system to infer an output corresponding to the first heuristic based, at least in part, on the one or more action events.

6. The processor of claim 1, wherein the processor is comprised in at least one of:
    a system for performing simulation operations;
    a system for performing simulation operations to test or validate autonomous machine applications;
    a system for performing digital twin operations;
    a system for performing light transport simulation;
    a system for rendering graphical output;
    a system for performing deep learning operations;
    a system implemented using an edge device;
    a system for generating or presenting virtual reality (VR) content;
    a system for generating or presenting augmented reality (AR) content;
    a system for generating or presenting mixed reality (MR) content;
    a system incorporating one or more Virtual Machines (VMs);
    a system for performing operations for a conversational AI application;
    a system for performing operations for a generative AI application;
    a system for performing operations using a language model;
    a system for performing one or more generative content operations using a large language model (LLM);
    a system implemented at least partially in a data center;
    a system for performing hardware testing using simulation;
    a system for performing one or more generative content operations using a language model;
    a system for synthetic data generation;
    a collaborative content creation platform for 3D assets; or
    a system implemented at least partially using cloud computing resources.

7. A system, comprising:
one or more processing units to predict a time period between a session launch and a ready state for a distributed computing session based at least on a hardware configuration executing the distributed computing session and one or more processing tasks to be executed during the distributed computing session, wherein the one or more processing units provide supplemental content for presentation during the time period prior to user operation of the distributed computing session.

8. The system of claim 7, wherein the distributed computing session corresponds to a gaming session executed on an underlying graphics processing unit (GPU).

9. The system of claim 8, wherein the one or more processing units are further to determine at least one of a memory usage or a temperature of the GPU.

10. The system of claim 7, wherein the hardware configuration is associated with a user submitting a request for the distributed computing session.

11. The system of claim 7, wherein the time period is determined without accessing a software application engine associated with the distributed computing session.

12. The system of claim 7, wherein the system is one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system for performing one or more generative content operations using a large language model (LLM);

a system implemented at least partially in a data center;

a system for performing hardware testing using simulation;

a system for performing one or more generative content operations using a language model;

a system for synthetic data generation;

a collaborative content creation platform for 3D assets; or a system implemented at least partially using cloud computing resources.

13. A computer-implemented method, comprising:

calculating, based at least on one or more operating parameters associated with underlying hardware performing one or more tasks for a distributed computing session, an estimated delay time between a session launch and a ready state for the distributed computing session;

determining supplemental content having a duration of presentation that is less than a sum of the estimated delay time and a predicted time gap; and providing the supplemental content for presentation between the session launch and the ready state.

14. The computer-implemented method of claim 13, wherein the one or more operating parameters include at least one of one or more underlying hardware features of one or more computing systems used to execute the computing session, a software application associated with the distributed computing session, or one or more features associated with the software application.

15. The computer-implemented method of claim 13, further comprising:

selecting, from a model database, a first model based at least on the one or more operating parameters and a software application associated with the distributed computing session, wherein the delay time is estimated using the first model.

16. The computer-implemented method of claim 13, wherein the estimated delay time corresponds to a period in which at least one of one or more interactive features or one or more graphical features of an application associated with the distributed computing session is inaccessible to a client.

17. The computer-implemented method of claim 13, further comprising:

receiving a first heuristic for a hardware component executing the distributed computing session;

identifying one or more action events during the distributed computing session; and training a machine learning system based at least on the one or more action events and the first heuristic.

18. The computer-implemented method of claim 17, wherein the first heuristic is at least one of memory consumption, a temperature value, or a processor load.

19. The computer-implemented method of claim 13, wherein the session launch and the ready state are determined without accessing an application engine associated with an application executing during the distributed computing session.

20. The computer-implemented method of claim 13, wherein the supplemental content includes a plurality of content elements.

* * * * *